(12) United States Patent
Ito

(10) Patent No.: US 9,683,121 B2
(45) Date of Patent: Jun. 20, 2017

(54) INK COMPOSITION, METHOD OF PRODUCING INK COMPOSITION, AND IMAGE FORMING METHOD

(71) Applicant: FUJIFILM CORPORATION, Minato-ku, Tokyo (JP)

(72) Inventor: Orie Ito, Kanagawa (JP)

(73) Assignee: FUJIFIL Corporation, Tokyo (JP)

( * ) Notice: Subject to any disclaimer, the term of this patent is extended or adjusted under 35 U.S.C. 154(b) by 0 days.

(21) Appl. No.: 14/855,394

(22) Filed: Sep. 16, 2015

(65) Prior Publication Data
US 2016/0090497 A1    Mar. 31, 2016

(30) Foreign Application Priority Data
Sep. 30, 2014    (JP) .................. 2014-202359

(51) Int. Cl.
*B41J 2/21*      (2006.01)
*C09D 11/36*    (2014.01)
(Continued)

(52) U.S. Cl.
CPC ............. *C09D 11/36* (2013.01); *B41J 2/2107* (2013.01); *C09D 11/00* (2013.01); *C09D 11/10* (2013.01); *C09D 11/30* (2013.01); *C09D 175/04* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................................................. 347/95–105
See application file for complete search history.

(56) References Cited

U.S. PATENT DOCUMENTS

2008/0131618 A1 * 6/2008 Nakamura ........... B41M 7/0081
427/511
2011/0292113 A1    12/2011 Nagase et al.
(Continued)

FOREIGN PATENT DOCUMENTS

JP           4600791 B1 * 12/2010 ................ B41J 3/04
JP         2011-140560 A    7/2011
(Continued)

OTHER PUBLICATIONS

Extended European Search Report dated Feb. 11, 2016 from the EPO in an European patent application corresponding to the instant patent application.
(Continued)

*Primary Examiner* — Manish S Shah
(74) *Attorney, Agent, or Firm* — SOLARIS Intellectual Properyu Group, PLLC

(57) ABSTRACT

The invention provides: an ink composition, a method of producing the ink composition, and an image forming method using the ink composition. The ink composition includes: a urethane resin that includes an alicyclic structure at a content of from 6,000 mmol/kg to 12,000 mmol/kg; a water-soluble organic solvent; water; and a colorant.

13 Claims, 1 Drawing Sheet

(51) Int. Cl.
*C09D 175/04* (2006.01)
*C09D 11/00* (2014.01)
*C09D 11/10* (2014.01)
*C09D 11/30* (2014.01)

(56) References Cited

U.S. PATENT DOCUMENTS

2013/0196124 A1  8/2013  Flores et al.
2013/0245157 A1* 9/2013  Kuriyama .............. C09D 11/30
                                        523/201
2013/0266776 A1 10/2013  Matsuoka et al.

FOREIGN PATENT DOCUMENTS

| JP | 2013-76020 A | 4/2013 |
| JP | 2013-527267 A | 6/2013 |
| WO | 2012/111360 | 8/2012 |

OTHER PUBLICATIONS

Japanese Office Action dated Nov. 29, 2016 in corresponding Japanese Patent Application No. 2014-202359 and a Partial English Translation thereof.
English language translation of the following: Office action dated Sep. 6, 2016 from the JPO in a Japanese patent application No. 2014-202359 corresponding to the instant patent application. This office action translation is submitted now in order to supplement the understanding of the cited references which are being disclosed in the instant Information Disclosure Statement.

* cited by examiner

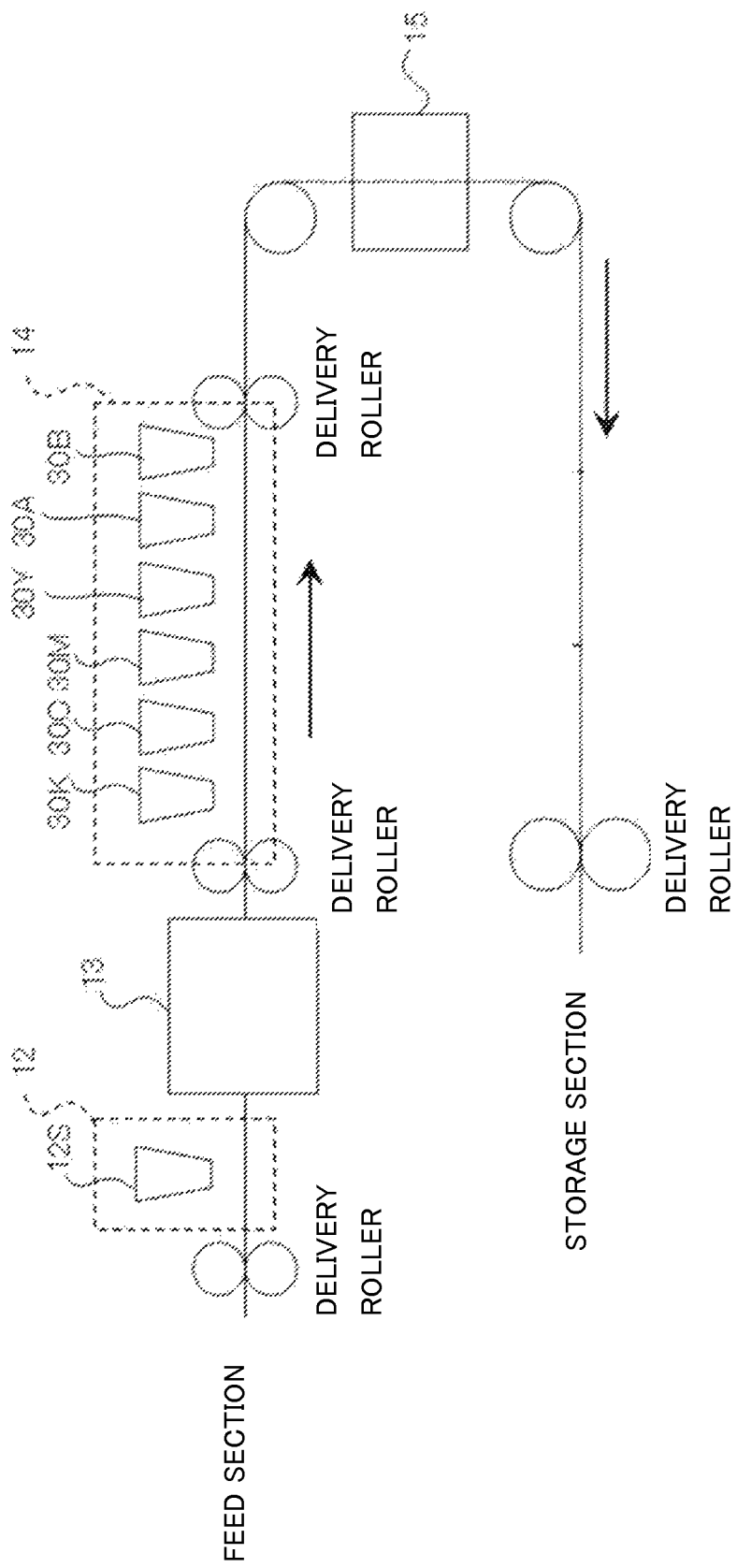

INK COMPOSITION, METHOD OF PRODUCING INK COMPOSITION, AND IMAGE FORMING METHOD

CROSS-REFERENCE TO RELATED APPLICATION

This application claims priority under 35 USC 119 from Japanese Patent Application No. 2014-202359 filed on Sep. 30, 2014, the disclosure of which is incorporated by reference herein.

BACKGROUND OF THE INVENTION

Field of the Invention

The present disclosure relates to an ink composition, a method of producing an ink composition, and an image forming method.

Description of the Related Art

An electrophotographic method, a sublimation type thermal transfer method, a melt type thermal transfer method, and an ink jet method and the like has been known as an image forming method in which an image is formed on a medium to be recorded such as a paper based on an image data signal.

For example, an image forming method which utilizes an ink jet method is a method of jetting an ink in a droplet form from a large number of jetting ports provided on an ink jet head. The ink jet method has been widely utilized because of reasons such as its ability to form a high quality image can be formed onto a wide variety of recording media. As an ink composition which is used for forming the image by an ink jet method, a variety of ink compositions have conventionally been proposed.

For example, as an ink for ink jet printing which can form a high-gloss printed image having both rubbing resistance and alkali resistance without impairing the jetting stability of the ink, an ink for ink jet printing containing a binder which is a polyurethane obtained by reacting a polyol including an alicyclic structure-containing polyol and a hydrophilic group-containing polyol with a polyisocyanate wherein a content of an alicyclic structure in the polyurethane is from 1,000 to 5,500 mmol/kg, and a pigment or a dye has been proposed (see, for example, Japanese Patent (JP-B) No. 4600791).

As an ink for ink jet printing which can form a printed image having rubbing resistance and chemical resistance and which is excellent in drying performance or storage stability of an ink, an ink for ink jet printing containing: a binder containing a urethane resin obtained by reacting a polyol including an anionic group-containing polyol, a polyol having on a side chain a polyalkylene oxide chain, and an alicyclic structure-containing polyol with a polyisocyanate; and a pigment or a dye has been proposed (see, for example, Japanese Patent Application Laid-Open (JP-A) No. 2011-140560).

A water-based ink jet ink composition containing a urethane resin particle, a pigment dispersion, an organic solvent, and water has been proposed (see, for example, JP-A No. 2013-76020).

SUMMARY OF THE INVENTION

As described in JP-B No. 4600791, one of physical properties required for an ink composition is the ability to form an image excellent in rubbing resistance is formed. As a method of improving the rubbing resistance of an image, an ink composition containing a urethane resin is used in JP-B No. 4600791.

Although a urethane resin is effective for improving the rubbing resistance of an image to be formed due to its flexible structure, there has been a tendency that the glass transition temperature of a resin is low and the blocking resistance of an image to be formed is not sufficient.

The present disclosure has been made in view of the above, and may provide an ink composition which provides an image attaining both rubbing resistance and blocking resistance, a method of producing the ink composition, and an image forming method using the same.

The present disclosure includes the followings.

<1> An ink composition, comprising:
a urethane resin that comprises an alicyclic structure at a content of from 6,000 mmol/kg to 12,000 mmol/kg;
a water-soluble organic solvent;
water; and
a colorant.

<2> The ink composition according to <1>, wherein 70 mol % or more of the urethane resin is produced by condensing a monomer having a content of an alicyclic structure of 30% by mass or more.

<3> The ink composition according to <1> or <2>, wherein the urethane resin comprises a structure in which a polyol including an alicyclic structure and a polyisocyanate including an alicyclic structure are condensed.

<4> The ink composition according to <3>, wherein the polyol including an alicyclic structure is a hydrogenated bisphenol A.

<5> The ink composition according to <3> or <4>, wherein the polyisocyanate including an alicyclic structure is 4,4'-methylenebis (cyclohexyl isocyanate).

<6> The ink composition according to any one of <1> to <5>, wherein the SP value of the water-soluble organic solvent is 21 MPa$^{1/2}$ or lower.

<7> The ink composition according to <6>, wherein a content of the water-soluble organic solvent is from 10% by mass to 50% by mass with respect to a content of the urethane resin.

<8> The ink composition according to any one of <1> to <7>, wherein the water-soluble organic solvent is tripropylene glycol monomethyl ether.

<9> The ink composition according to any one of <1> to <8>, wherein the urethane resin comprises an alicyclic structure at a content of from 6,500 mmol/kg to 10,000 mmol/kg.

<10> The ink composition according to any one of <1> to <8>, wherein the urethane resin comprises an alicyclic structure at a content of from 6,500 mmol/kg to 10,000 mmol/kg, and a content of the water-soluble organic solvent is from 10% by mass to 50% by mass with respect to a content of the urethane resin.

<11> The ink composition according to any one of <1> to <10>, which is used for ink jet recording.

<12> An image forming method, comprising forming an image by applying the ink composition according to any one of <1> to <11> to an image recording medium by an ink jet method.

<13> A method of producing an ink composition, the method comprising:
manufacturing a urethane resin that comprises an alicyclic structure at a content of from 6,000 mmol/kg to 12,000 mmol/kg by condensing all raw material monomers, 70 mol % or more of the all raw material monomers comprising an alicyclic structure, and a mass of the alicyclic structure with respect to a mass of the monomer being 30% or more; and preparing the ink composition by mixing the urethane resin, a water-soluble organic solvent, water, and a colorant.

<14> The method of producing an ink composition according to <14>, wherein the manufacturing of the urethane resin comprises condensing a polyol including an alicyclic structure and a polyisocyanate including an alicyclic structure.

BRIEF DESCRIPTION OF THE DRAWING

The FIGURE is a schematic diagram illustrating an example of a configuration of an ink jet recording apparatus which is used for forming an image.

DETAILED DESCRIPTION OF THE INVENTION

In the present disclosure, when the amounts of the respective components in a composition are indicated, in the case where plural materials corresponding to a component are present in the composition, an amount of the component means a total amount of plural materials present in the composition unless otherwise specifically limited.

In the present disclosure, a numerical range described by using the expression of "from . . . to . . . " represents a range including numerical values described in behind of the "from" as the minimum value and behind the "to", as the maximum value.

In notations of groups (atomic groups) in the present disclosure, a notation of a group (atomic group) which does not specify the presence or absence of substitution intends to include both of a group having a substituent and a group having no substituent in a scope of the group. For example, "an alkyl group" is intended to include not only an alkyl group having no substituent (an unsubstituted alkyl group) but also an alkyl group having a substituent (a substituted alkyl group).

A "solid content" represents a total content of the component(s) other than a solvent in the ink composition of the present disclosure at 25° C. unless otherwise specifically limited. The "solid content" in the the present disclosure includes any component which is not a solvent but is in a liquid state, example of which including a low molecular component.

In the present disclosure, "(meth)acrylic acid" may indicate either or both of acrylic acid and methacrylic acid in some cases, and "(meth)acrylate" may indicate to represent either or both of acrylate and methacrylate in some cases.

Not only a step or a process which is independent, but also a step or a process which is unable to be clearly distinguished from other steps or processes is included in the term "step" and "process", as long as it is a step/process which accomplishes the action desired therein.

<<Ink Composition>>

The ink composition of the present disclosure includes a urethane resin that includes an alicyclic structure at a content of from 6,000 mmol/kg to 12,000 mmol/kg, a water-soluble organic solvent, water, and a colorant.

Although the detail of the action mechanism of the present disclosure is not clear, it is assumed as follows.

It is thought that, since the content of an alicyclic structure in the urethane resin of the present disclosure is from 6,000 mmol/kg to 12,000 mmol/kg, the glass transition temperature of the resin is high, thereby attaining an excellent blocking resistance. On the other hand, it is thought that, since the urethane resin of the present disclosure includes, as its entity, a urethane structure, a flexible structure can be maintain, thereby obtaining excellent rubbing resistance.

It is thought that an image attaining both rubbing resistance and blocking resistance can be formed because the ink composition of the present disclosure includes such a urethane resin.

Each component included in the ink composition will be described below.

<Urethane Resin>

The ink composition of the present disclosure includes at least one urethane resin including an alicyclic structure at a content of from 6,000 mmol/kg to 12,000 mmol/kg.

Since the content of an alicyclic structure in the urethane resin is 6,000 mmol/kg or higher, the glass transition temperature of the resin is high and the thermal stability of the ink composition and the blocking resistance of an image to be formed are excellent. Since the content of an alicyclic structure is 12,000 mmol/kg or lower, flexibility of the resin is maintained, and an image to be formed has excellent rubbing resistance.

The content of an alicyclic structure is from 6,000 mmol/kg to 12,000 mmol/kg, and is preferably from 6,500 mmol/kg to 10,000 mmol/kg, and more preferably 7,000 mmol/kg to 8,000 mmol/kg.

The "content of an alicyclic structure" in the present disclosure is calculated based on a total mass of a raw material(s) used for producing the urethane resin (a raw material monomer(s) mentioned below) and a number of moles of the alicyclic structure in the monomer containing an alicyclic structure and used for producing the urethane resin. In other words, the "content of an alicyclic structure" is the rate of the number of moles of the alicyclic structure in the raw material with respect to the total mass of a material used for producing a urethane resin.

The content of an alicyclic structure in the urethane resin can be adjusted by the formulation of monomers used for producing the urethane resin.

The alicyclic structure in the present disclosure means a saturated or unsaturated, cyclic hydrocarbon structure which does not have aromaticity.

Examples of the alicyclic structure include a cyclobutyl ring, a cyclopentyl ring, a cyclohexyl ring, a cycloheptyl ring, a cyclooctyl ring, a tricyclo[5,2,1,0,2,6]decyl skeleton, a bicyclo[4,3,0]-nonyl skeleton, a tricyclo[5,3,1,1]dodecyl skeleton, a propyl tricyclo[5,3,1,1]dodecyl skeleton, a norbornene skeleton, an isobornyl skeleton, a dicyclopentanyl skeleton, and an adamantyl skeleton.

The urethane resin of the present disclosure can be produced from a raw material monomer containing at least an alcohol including two or more hydroxyl groups (hereinafter, also referred to as "polyol") and a compound including two or more isocyanate groups (hereinafter, also referred to as "polyisocyanate"). At least one of the polyol or the polyisocyanate includes a compound including an alicyclic structure.

Preferably, the urethane resin of the present disclosure is at least a product produced by condensation of a polyol including an alicyclic structure and a polyisocyanate including an alicyclic structure, that is one that includes a structure produced by condensation of a polyol including an alicyclic structure and a polyisocyanate including an alicyclic structure. Inclusion of a urethane resin formed by using both a polyol including an alicyclic structure and a polyisocyanate including an alicyclic structure as the raw material monomers may enable to obtain an image having improved rubbing resistance and blocking resistance.

In preferable embodiments, from 70 mol % to 100 mol % of the urethane resin of the present disclosure is produced by condensing a monomer having a content of an alicyclic structure of 30% by mass or more. That is, 70 mol % or more of the urethane resin is produced by condensing one kind or plural kinds of monomers each having a rate of a mass of an alicyclic structure in the monomer to the mass of the monomer (herein referred to as the "content of an alicyclic structure") of 30% or more. In other words, the urethane resin of the present disclosure preferably includes a structure in which all raw material monomers are condensed, from 70 mol % to 100 mol % of the all raw material monomers each include an alicyclic structure, and a mass of the alicyclic structure with respect to a mass of each of the alicyclic structure-containing monomers is 30% or more.

As mentioned above, by incorporating into the raw material monomers a monomer having a high content of an alicyclic structure (monomer in which a rate of a mass of an alicyclic structure in the monomer to a mass of the monomer is large) at a large amount, a urethane resin having a content of an alicyclic structure of from 6,000 mmol/kg to 12,000 mmol/kg can be efficiently obtained.

A balance between the glass transition temperature of the urethane resin and flexibility, which is an effect of the inclusion of an alicyclic structure, is likely to be exhibited by the inclusion of a monomer having a content of an alicyclic structure of 30% by mass or more in the raw material monomer(s) at the above-described amount, and an image with improved rubbing resistance and blocking resistance may be obtained.

The content fan alicyclic structure in the monomer is, from the viewpoint of blocking resistance, preferably 40% by mass or more, and still more preferably 50% by mass or more.

Since 70 mol % or more of the urethane resin produced by condensing a monomer having a content of an alicyclic structure of 30% by mass or more, an effect due to inclusion of an alicyclic structure is likely to be exhibited, and an image whose rubbing resistance and blocking resistance are improved is obtained. The rate of a monomer having a content an alicyclic structure of 30% by mass or more to all the raw material monomer(s) used for producing the urethane resin is, from the viewpoint of blocking resistance, preferably 75 mol % or more, and more preferably 80 mol % or more.

[Raw Material Monomer]

Examples of the raw material monomer used for producing the urethane resin in the present disclosure include polyol, polyisocyanate, and polycarbonate.

The term "raw material monomer(s)" herein generally refers to all monomers used for producing the urethane resin.

(Polyol)

Examples of the polyol include: polyols including an alicyclic structure such as cyclobutanediol, cyclopentanediol, 1,4-cyclohexane diol, cycloheptanediol, cyclooctanediol, cyclohexanedimethanol, hydroxypropyl cyclohexanol, tricyclo[5,2,1,0,2,6]decane-dimethanol, bicyclo[4,3,0]-nonanediol, dicyclohexane diol, tricyclo[5,3,1,1]dodecanediol, bicyclo[4,3,0]nonane dimethanol, tricyclo[5,3,1,1]dodecane diethanol, hydroxypropyltricyclo[5,3,1,1]dodecanol, spiro[3,4]octane diol, butylcyclohexanediol, 1,1'-bicyclohexylidenediol, cyclohexanetriol, hydrogenated bisphenol A, and 1,3-adamantanediol; polyols including an aromatic ring structure such as bisphenol A-ethylene oxide adduct diol, bisphenol A-propylene oxide adduct diol, bisphenol A-butylene oxide adduct diol, bisphenol F-ethylene oxide adduct diol, bisphenol F-propylene oxide adduct diol, bisphenol F-butylene oxide adduct diol, hydroquinone-alkylene oxide adduct diol, and naphthoquinone-alkylene oxide adduct diol; polyols including a chain structure such as dihydric alcohols such as ethylene glycol, diethylene glycol, propylene glycol, dipropylene glycol, 1,4-butane diol, neopentyl glycol, 1,5-pentane diol, 3-methyl pentane diol, 1,4-hexane diol, 1,6-hexane diol, and, tri- or higher-valent polyhydric alcohols such as glycerin, trimethylolethane, trimethylolpropane, and pentaerythritol; 2,2'-dimethylolpropionic acid, 2,2'-dimethylolbutanoic acid, 2,2'-dimethylolbutyric acid, 2,2'-dimethylolvaleric acid, 2,2-bis(hydroxymethyl)butyric acid, and polyols to which a hydrophilic group such as a dicarboxylic acid such as 5-sulfoisophthalic acid, sulfoterephthalic acid, 4-sulfophthalic acid, or 5[4-sulfophenoxy]isophthalic acid is added.

These may be used singly, or two or more of these may be used in combination.

Among these polyols, from the viewpoint of attaining both rubbing resistance and blocking resistance, a polyol including an alicyclic structure is preferable, hydrogenated bisphenol A, 1,4-cyclohexanedimethanol, and cycloheptane diol are more preferable, and hydrogenated bisphenol A is still more preferable.

From the viewpoint of improving dispersibility of the urethane resin in the ink composition, it is more preferable to use a polyol to which a hydrophilic group is added in combination with a polyol including an alicyclic structure.

Examples of the hydrophilic group include an anionic group, a cationic group, and a nonionic group.

(Polyisocyanate)

Examples of the polyisocyanate include: an organic polyisocyanate itself such as: a polyisocyanate including an alicyclic structure such as hydrogenated xylylene diisocyanate, isophorone diisocyanate (IPDI), metylcyclohexane-2,4 (or 2,6)-diisocyanate, 4,4'-methylenebis (cyclohexyl isocyanate) (HMDI), 1,3-(isocyanatemethyl) cyclohexane, or 1,5-diisocyanate decalin (IPD); a polyisocyanate including a chain structure such as lysine diisocyanate, hexamethylene diisocyanate, trimethyl hexane diisocyanate, or lysine triisocyanate; a polyisocyanate including an aromatic ring structure such as tolylene diisocyanate, xylylene diisocyanate, or diphenyl methane diisocyanate; or a tri- or higher-valent polyisocyanate; or an adduct of each of these organic polyisocyanates and a polyhydric alcohol, a low molecular weight polyester resin or hydrogen; a cyclized polymer formed of the above-described diisocyanate compounds (for example, isocyanurate); and a biuret adduct.

These may be used singly, or two or more of these may be used in combination.

Among these polyisocyanates, from the viewpoint of attaining both rubbing resistance and blocking resistance, a polyisocyanate including an alicyclic structure is preferable, isophorone diisocyanate (IPDI), 4,4'-methylenebis (cyclohexyl isocyanate) (HMDI), and 1,5-diisocyanate decalin (IPD) are more preferable, and 4,4'-methylenebis (cyclohexyl isocyanate) (HMDI) is still more preferable.

(Polycarbonate)

Examples of the polycarbonate include a diol polycarbonate. The diol polycarbonate is produced by a reaction such as a de-methanol condensation reaction of a dialcohol and dimethyl carbonate, a de-phenol condensation reaction of a dialcohol and diphenyl carbonate, or a de-ethylene glycol condensation reaction of a dialcohol and ethylene carbonate. Examples of a polyhydric alcohol which is used in such reactions include: a saturated or unsaturated glycol such as 1,6-hexane diol, diethylene glycol, triethylene glycol, propylene glycol, 1,3-butane diol, 1,4-butane diol, neopentyl glycol, pentane diol, 3-methyl-1,5-pentane diol, octane diol, 1,4-butyne diol, dipropylene glycol, tripropylene glycol, or polytetramethylene ether glycol; and an alicyclic glycol such as 1,4-cyclohexane diglycol, or 1,4-cyclohexanedimethanol.

—Physical Properties of Urethane Resin—

A glass transition temperature (Tg) of the urethane resin of the present disclosure is, from the viewpoint of rubbing resistance of an image and thermal stability of an ink composition, preferably from 10° C. to 120° C., more preferably from 30° C. to 110° C., and still more preferably from 40° C. to 105° C.

For the glass transition temperature of the urethane resin, a Tg obtained by an actual measurement is applied.

Specifically, the measured Tg means a value measured by using a differential scanning calorimetry (DSC) EXSTAR6220 (trade name) manufactured by SII Nanotechnology Inc. under the following conditions.

5 mg of a sample was enclosed in an aluminum pan, measurement is performed under a nitrogen atmosphere under the following condition of the temperature profile, and a peak top value in the measured data of (4) (second warming) of the following temperature profile is used as the measured Tg of the glass transition temperature of the urethane resin.

(1) 30° C.→50° C. (cooling at 50° C./min.)
(2) −50° C.→120° C. (warming at 20° C./min.)
(3) 120° C.→50° C. (cooling at 50° C./min.)
(4) −50° C.→120° C. (warming at 20° C./min.)

A weight-average molecular weight of the urethane resin is not particularly restricted, and is preferably from 10,000 to 100,000, more preferably from 30,000 to 80,000, and still more preferably from 50,000 to 70,000. In a case in which the weight-average molecular weight is 10,000 or higher, an amount of a water-soluble component can be effectively minimized. In a case in which the weight-average molecular weight is 100,000 or smaller, the self-dispersion stability can be improved.

The weight-average molecular weight of the urethane resin is measured by gel permeation chromatography (GPC). GPC can be performed by using HLC-8020GPC (trade name, manufactured by Tosoh Corporation), with three columns of TSKgel, Super Multipore HZ-H (trade name, manufactured by Tosoh Corporation, 4.6 mmID×15 cm) as columns and THF (tetrahydrofuran) as an eluant. GPC is performed under conditions of a sample concentration of 0.45% by mass, a flow rate of 0.35 ml/min, a sample injection volume of 10 μl, and a measurement temperature of 40° C. by using an RI detector. A calibration curve is created by eight samples of: "F-40", "F-20", "F-4", "F-1", "A-5000", "A-2500", "A-1000", and "n-propylbenzene" of "standard sample TSK standard, polystyrene" (all are trade names, manufactured by Tosoh Corporation).

An the acid value of the urethane resin is not particularly restricted. The acid value is preferably from 20 mgKOH/g to 80 mgKOH/g, more preferably from 25 mgKOH/g to 70 mgKOH/g, and still more preferably from 35 mgKOH/g to 65 mgKOH/g. The acid value is represented by the number of moles of potassium hydroxide required for neutralizing 1 gram (g) of a resin. In other words, the acid value is a value determined by a measurement method in accordance with the "test methods for acid value, saponification value, ester value, iodine value, hydroxyl value and unsaponifiable matter of chemical products" of JIS standard (JISK0070:1992), that is herein incorporated by reference in its entity.

The urethane resin is preferably contained in form of particles. In an ink composition, it can be used in a form of a water dispersion containing urethane resin particles, that is a so-called latex.

A content of the urethane resin in an ink composition, which means a total content when two or more types of urethane resins are contained in the ink composition, is not particularly restricted, and is, based on a total amount of the ink composition, preferably from 0.1% by mass to 20.0% by mass, more preferably from 0.5% by mass to 15.0% by mass, and particularly preferably from 1.0% by mass to 10.0% by mass.

When the above-described content is 0.1% by mass or larger, the rubbing resistance of an image may be improved.

When the above-described content is 20.0% by mass or smaller, the jetting performance of an ink may be be improved, and in addition, occurrence of precipitation may be advantageously inhibited under low-temperature environments.

—Method of Producing Urethane Resin—

Although a method of producing the urethane resin is not particularly restricted, for example, the urethane resin can be produced by performing a known operation applied to a method of producing an emulsified dispersion, which includes preparing an oil phase and a water phase by using a polyisocyanate for an oil phase component and using a polyol for a water phase component and mixing them.

When the urethane resin of the present disclosure is produced, other monomers may be incorporated thereto together with a polyisocyanate and a polyol.

When the urethane resin of the present disclosure is produced, a dispersant, a surfactant or the like may be added thereto other than the above-described monomers. A dispersant, a surfactant or the like may be added to an oil phase component and/or a water phase component depending on the solubility.

<Water>

The ink composition of the present disclosure includes water.

A content of water in the ink composition is not particularly restricted, and can be 50% by mass or higher with respect to the total amount of the ink composition.

A preferable content of water in the ink composition is, with respect to the total amount of the ink composition, preferably from 50% by mass to 90% by mass, more preferably from 50% by mass to 80% by mass, and still more preferably from 50% by mass to 70% by mass.

<Colorant>

An ink composition of the present disclosure includes at least one type of a colorant.

The colorant is not particularly restricted, and may be a pigment or a dye.

(Pigment)

The pigment is not particularly restricted and may be appropriately selected depending on the purpose. For example, the pigment may be an organic pigment or an inorganic pigment. The pigment is preferably almost water-insoluble or hardly water-soluble from a viewpoint of ink coloring property.

Examples of the organic pigments include azo pigments, polycyclic pigments, dye chelates, nitro pigments, nitroso pigments, and aniline black. Among these organic pigments, azo pigments, polycyclic pigments or the like are more preferred. Examples of the inorganic pigments include titanium oxide, iron oxide, calcium carbonate, barium sulfate, aluminum hydroxide, barium yellow, cadmium red, chrome yellow, and carbon black. Among these inorganic pigments, carbon black is particularly preferred.

When an organic pigment is used, the smaller an average particle size of the organic pigment is, the better from the viewpoint of transparency and color reproducibility. On the other hand, the larger an average particle size of the organic pigment is, the more preferable from the viewpoint of light resistance. From the viewpoint of attaining all of the above properties at the same time, the average particle size is preferably from 10 nm to 200 nm, more preferably from 10 nm to 150 nm, and still more preferably from 10 nm to 120 nm. A particle size distribution of the organic pigment is not particularly restricted, and may be a wide particle size distribution or a monodisperse particle size distribution. Two or more types of organic pigment having monodisperse particle size distribution may be mixed to be used.

—Dispersant—

A pigment of the ink composition of the present disclosure is preferably dispersed by a dispersant.

As the dispersant for a pigment, any of a polymeric dispersant and a low molecular weight surfactant dispersant may be employed. The polymeric dispersant may be any of a water-soluble dispersant and a non-water-soluble dispersant.

For the low molecular weight surfactant dispersant, for example, the known low molecular weight surfactant dispersant described in paragraphs 0047 to 0052 of JP-A No. 2011-178029 can be used.

Examples of the water-soluble dispersant among the polymeric dispersant include a hydrophilic polymer compound. Examples of a natural hydrophilic polymer compound include: plant polymers such as gum arabic, tragacanth gum, guar gum, karaya gum, locust bean gum, arabinogalacton, pectin, and pyrus cydonia seed starch; seaweed polymers such as alginic acid, carrageenan, and agar; animal polymers such as gelatin, casein, albumin, and collagen; and microorganism polymers such as xanthene gum and dextran.

Examples of a hydrophilic polymer compound which is obtained by modifying a natural product as a raw material include: cellulose polymers such as methyl cellulose, ethyl cellulose, hydroxyethyl cellulose, hydroxypropyl cellulose, and carboxymethyl cellulose; starch polymers such as sodium starch glycolate, and sodium starch phosphate; and seaweed polymers such as alginic acid sodium, and alginic acid propylene glycol ester.

Examples of synthetic hydrophilic polymer compounds include: vinyl polymers such as polyvinyl alcohol, polyvinylpyrrolidone and polyvinyl methyl ether; acrylic resins such as non-cross-linking polyacrylamide, polyacrylic acid or an alkali metal salt thereof, and water-soluble styrene acrylic r sin; water-soluble styrene maleic acid resin; water-soluble vinylnaphthalene acrylic resin; water-soluble vinyl-naphthalene maleic acid resins; polyvinylpyrrolidone; polyvinyl alcohol; alkali metal salts of formalin condensates of β-naphthalene sulfonic acid; polymeric compounds having, at a side chain, a salt of a cationic functional group such as a quaternary ammonium group or an amino group; and natural polymeric compounds such as shellac.

Among these, water-soluble dispersants to which a carboxyl group is introduced are preferable as the hydrophilic polymer compounds. Examples thereof include homopolymers of acrylic acid or methacrylic acid, and copolymers thereof with another monomer having a hydrophilic group such as styrene acrylic acid copolymer.

As the non-water-soluble dispersant of the polymeric dispersant, a polymer having both a hydrophilic moiety and a hydrophobic moiety can be used. Examples of the non-water-soluble dispersant include styrene-(meth)acrylic acid copolymer, styrene-(meth)acrylic acid-(meth)acrylate ester copolymer, (meth)acrylate ester-(meth)acrylic acid copolymer, polyethylene glycol(meth)acrylate-(meth)acrylic acid copolymer, vinylacetate-maleic acid copolymer, and styrene-maleic acid copolymer.

A weight-average molecular weight of the polymeric dispersant is preferably from 3,000 to 100,000, more preferably from 5,000 to 50,000, still more preferably from 5,000 to 40,000, and particularly preferably from 10,000 to 40,000.

The weight-average molecular weight of the polymeric dispersant is measured in a similar manner to that of the weight-average molecular weight of the above-described urethane resin.

From the viewpoint of self-dispersibility and coagulation speed when the polymeric dispersant is in contact with a treatment liquid, the polymeric dispersant preferably includes a polymer having a carboxyl group, preferably a polymer having a carboxyl group and having an acid value of 100 mgKOH/g or less, and more preferably a polymer having an acid value of from 25 mgKOH/g to 100 mgKOH/g. In particular, when the ink composition of the present disclosure is used together with a treatment liquid which aggregates a component in the ink composition, a polymeric dispersant having a carboxyl group and having an acid value of from 25 mgKOH/g to 100 mgKOH/g is effective. A treatment liquid will be described below.

The mixing mass ratio (p:s) of a pigment (p) and a dispersant (s) is preferably in a range of from 1:0.06 to 1:3, more preferably in a range of from 1:0.125 to 1:2, and still more preferably in a range of from 1:0.125 to 1:1.5.

From the viewpoint of light resistance of an image, quality of an image and the like, preferably the dispersant is contained together with the pigment, and more preferably the organic pigment and the polymeric dispersant (preferably a polymeric dispersant containing a carboxyl group) are contained in the ink composition.

The ink composition preferably contains a polymer-coated pigment in which at least a part of the surface of the pigment is covered with a polymeric dispersant. The ink composition particularly preferably contains the polymer-coated pigment in which at least a part of the surface of the pigment is covered with a polymeric dispersant having a carboxyl group. From the viewpoint of aggregation performance, the ink composition particularly preferably contains a water-insoluble, polymer-coated pigment in which at least a part of the surface of the pigment is covered with a polymeric dispersant having a carboxyl group.

An average particle size of the pigment in a dispersion state (for example, the average particle size of a polymer-coated pigment) is preferably from 10 nm to 200 nm, more preferably from 10 nm to 150 nm, and still more preferably from 10 nm to 100 nm. When the average particle size is 200 nm or smaller, the color reproducibility may become favorable, and jetting characteristics during jetting by an ink jet method may become favorable. When the average particle size is 10 nm or larger, the light resistance may become favorable. The particle size distribution of a colorant is not particularly restricted, and may be any of a wide particle size distribution and a monodisperse particle size distribution. Two types or more of colorants having a monodisperse particle size distribution may be used in mixture. Here, the average particle size of a pigment in a dispersion state means the average particle size of the pigment in an ink state, and the average particle size of a pigment contained in a so-called condensed ink dispersion which is in a pre-ink state is similar to the above.

The average particle size of a pigment in a dispersion state is determined in a similar manner to that of the average particle size and the particle size distribution of the above-described specific polymer particle.

The pigment may be used singly or in combination of two or more thereof.

From the viewpoint of image density, a content of the pigment in the ink composition is preferably from 1% by mass to 20% by mass, and more preferably from 2% by mass to 10% by mass, with respect to an amount of the ink composition.

(Dye)

As the dye, a known dye can be used without particular restriction, and for example, a dye described in JP-A No. 2001-115066, JP-A No. 2001-335714, JP-A No. 2002-249677 or the like can be suitably used also in the present disclosure.

When a dye is used, a dye held on a water-insoluble carrier may be used. A water-insoluble coloring particle, which is a carrier which holds a dye, can be used as in a form of an aqueous dispersion by using a dispersant. The carrier is not particularly restricted as long as the carrier is water-insoluble or hardly soluble to water, and an inorganic material, an organic material and a composite material thereof can be used. Specifically, a carrier described in JP-A No. 2001-181549, JP-A No. 2007-169418 or the like can be suitably used in the present disclosure.

<Water-Soluble Organic Solvent>

The ink composition of the present disclosure contains at least one water-soluble organic solvent.

The water-soluble organic solvent in the present disclosure means an organic solvent having a solubility in water which enables dissolving, in water at 25° C., the organic solvent at an amount of 1% by mass or more with respect to an amount of the water.

As the water-soluble organic solvent, a known water-soluble organic solvent described in paragraphs 0124 to 0135 of JP-A No. 2011-074150, paragraphs 0115 to 0128 of JP-A No. 2011-042150, paragraphs 0104 to 0119 of JP-A No. 2011-079901, or the like can also be used.

These water-soluble organic solvents may be used singly, or two or more thereof may be used in combination.

Specific examples of the water-soluble organic solvent include the following. The numerical value in parentheses after the following specific example is a SP value (unit: $MPa^{1/2}$).

The SP value (solubility parameter/unit: $MPa^{1/2}$) of a water-soluble organic solvent in the present disclosure is a value represented by the square root of a molecular aggregation energy, which can be calculated by a method described in R. F. Fedors, Polymer Engineering Science, 14, pp. 147 to 154 (1974), and this numerical value is employed in the present disclosure.

Examples of the water-soluble organic solvent include polyethylene glycol (26.1), 1,2-hexanediol (24.1), diethylene glycol monobutyl ether (21.5), dipropylene glycol (27.1), 1,2-butane diol (26.1), ethylene glycol monoethyl ether (23.5), ethylene glycol monobutyl ether (22.1), diethylene glycol monomethyl ether (23.0), diethyleneglycol monoethylether (20.9), diethylene glycol monopropyl ether (21.9), triethylene glycol monomethyl ether (22.1), triethylene glycol monoethyl ether (21.7), triethylene glycol monobutyl ether (21.1), propylene glycol monomethyl ether (23.1), propylene glycol monoethyl ether (22.3), propylene glycol monopropyl ether (21.8), propylene glycol monobutyl ether (21.4), dipropylene glycol monomethyl ether (21.3), dipropylene glycol monopropyl ether (20.7), dipropylene glycol monobutyl ether (20.5), dipropylene glycol t-butyl ether (20.0), tripropylene glycol monomethyl ether (20.4), diethylene glycol monohexyl ether (20.9), ethylene glycol mono-2-ethyl hexyl ether (20.5), diethylene glycol mono-2-ethyl hexyl ether (20.3), and 1,3-dimethyl-2-imidazolidinone (20.3).

Among these water-soluble organic solvents, a water-soluble organic solvent having an SP value of 21 $MPa^{1/2}$ or less is preferable, and at least one selected from tripropylene glycol monomethyl ether (20.4), diethyleneglycol monoethylether (20.9), and 1,3-dimethyl-2-imidazolidinone (20.3) is more preferable.

When the SP value of the water-soluble organic solvent is in the above-described range, film forming properties may be improved and thus it may be advantageous in terms of rubbing resistance.

The content of a water-soluble organic solvent whose SP value in an ink composition is 21 $MPa^{1/2}$ or less is preferably from 10% by mass to 50% by mass with respect to the mass (content) of the urethane resin in the ink composition.

When the content of the water-soluble organic solvent is 10% by mass or larger, the rubbing resistance may be improved, and when the content of the water-soluble organic solvent is 50% by mass or smaller, the blocking resistance may be improved.

<Inorganic Salt>

The ink composition of the present disclosure preferably contains an inorganic salt.

The inorganic salt in the present disclosure is not particularly limited, and examples of the inorganic salt include a salt of an alkali metal (for example, potassium or lithium), which is in group 1 on the periodic table or an alkaline-earth metal (for example, calcium, magnesium), which is in group 2 on the periodic table. As the salt, chloride, hydrochloride and nitrate are suitable. Among these, from the viewpoint of an excellent effect of stability with time, an alkali metal salt is preferable, and lithium chloride, lithium nitrate, potassium chloride, and potassium nitrate are particularly preferable.

The inorganic salts can be used singly or two or more of these can be used in combination.

A content of an inorganic salt in the ink composition of the present disclosure (, which is a total content in the case of using two or more types of inorganic salts,) is not particularly limited, and is preferably from 0.01% by mass to 1% by mass, more preferably from 0.03% by mass to 0.5% by mass, and particularly preferably from 0.05% by mass to 0.1% by mass, with respect to a total amount of the ink composition.

<Surfactant>

The ink composition of the present disclosure can contain at least one surfactant as needed. The surfactant can be used, for example, as a surface tension regulator.

As the surfactant, a compound such as one that having, in the molecule, a structure containing both a hydrophilic portion and a hydrophobic portion can be effectively used. Any of an anionic surfactant, a cationic surfactant, an amphoteric surfactant, a nonionic surfactant, a betaine surfactant may be used. The above-described water-soluble polymer (polymeric dispersant) may also be used as the surfactant.

In the present disclosure, from the viewpoint of inhibiting jetting interference of an ink, a nonionic surfactant is preferable, and among these, acetylene glycol derivatives (acetylene glycol surfactant) are more preferable.

Examples of the acetylene glycol surfactant include an alkylene oxide adduct of 2,4,7,9-tetramethyl-5-decyne-4,7-diol and 2,4,7,9-tetramethyl-5-decyne-4,7-diol. Preferably the acetylene glycol surfactant is at least one selected from the above. Examples of commercially available products of such compounds include OLFINE® E series such as E1010 manufactured by Nissin Chemical Industry Co., Ltd.

When the ink composition contains a surfactant (surface tension regulator), from the viewpoint of favorably performing jetting of the ink composition by an ink jet method, a content of the surfactant in the ink composition may be preferably in a range in which the surface tension of the ink composition can be adjusted to from 20 mN/m to 60 mN/m, and from the viewpoint of the surface tension, more preferably from 20 mN/m to 45 mN/m, and still more preferably from 25 mN/m to 40 mN/m.

For the surface tension value, a value measured by using Automatic Surface Tensiometer CBVP-Z (trade name, manufactured by Kyowa Interface Science Co., Ltd. under a condition of a liquid temperature of 25° C. is used.

When the ink composition of the present disclosure contains a surfactant, a specific content of the surfactant is not particularly limited, and is preferably 0.1% by mass or larger, more preferably from 0.1% by mass to 10% by mass, and still more preferably from 0.2% by mass to 3% by mass.

<Wax Particle>

The ink composition of the present disclosure can contain at least one type of wax particle. This can improves the rubbing resistance.

Examples of the wax particle include a particle of plant or animal wax such as Carnauva wax, Candelilla wax, beeswax, rice wax, or lanolin; petroleum wax such as paraffin wax, microcrystalline wax, polyethylene wax, oxidized polyethylene wax, or petrolatum; mineral-based wax such as montan wax or ozokerite; a synthetic wax such as a carbon wax, Hoechst wax, polyolefin wax, or octadecanamide; natural wax or synthetic wax such as α-olefin.anhydrous maleic acid copolymer, or particle of mixture thereof The wax is preferably added in a dispersion form, and can be contained in an ink composition, for example, in a form of a dispersion such as emulsion. A solvent which is preferably used for the dispersion is water, but not limited thereto, and for example, a normally used organic solvent can be appropriately selected and used for disper sing. For the organic solvent, description in paragraph 0027 of JP-A No. 2006-91780 can be referred to.

The wax particle can be used singly or two or more thereof can be used in mixture.

For the wax particle, one that is commercially available may also be used. Examples of the commercially available wax particle include SEROZOL 524 (trade name, manufactured by Chukyo Yushi Co., Ltd., Carnauva wax), NOP-COAT PEM17 (trade name, manufactured by San Nopco Ltd., polyethylene wax), CHEMIPEARL® W4005 (manufactured by Mitsui Chemicals, Inc., polyethylene wax), AQUACER515 (trade name, manufactured by BYK Japan KK, polyethylene wax), and AQUACER593 (trade name, manufactured by BYK Japan KK, polypropylene wax).

Among the above-described wax, Carnauva wax and polyolefin wax are preferable, and from the viewpoint of rubbing resistance, Carnauva wax is particularly preferable.

When the ink composition of the present disclosure contains a wax particle, a content ratio of the urethane resin to the wax particle (urethane resin:wax particle) is preferably in a range of from 1:5 to 5:1 (solid content mass ratio). When the content ratio is in this range, an image with an excellent rubbing resistance can be obtained.

<Polymer Particle>

The ink composition of the present disclosure may contain polymer particle other than the above-described urethane resin and the above-described wax particles. When a non-water-soluble or hardly water-soluble polymer particle is contained separately from the above-described resin which covers a pigment, fixability of the ink composition to a recording medium and rubbing resistance of a formed image are improved.

The expression that a polymer is "non-water-soluble or hardly water-soluble" means that, when the polymer is dried at 105° C. for two hours and then dissolved in 100 g of water at 25° C., an amount of the polymer dissolved is 15 g or less. From the viewpoint of improving continuous jetting performance and jetting stability of an ink, the amount of the polymer dissolved is preferably 10 g or smaller, still more preferably 5 g or smaller, and particularly preferably 1 g or smaller. The amount of the polymer dissolved is an amount of the polymer dissolved under the condition that the polymer is neutralized 100% by sodium hydroxide or acetic acid, the selection of which depends on the type of a salt-producing group of the polymer.

Examples of the polymer particle include a particle formed of a r sin such as acrylic resin, vinyl acetate resin, styrene-butadiene resin, vinyl chloride resin, acrylic-styrene resin, butadiene resin, styrene resin, a cross-linked acrylic resin, a cross-linked styrene resin, benzoguanamine resin, phenol resin, silicone resin, epoxy resin, paraffin resin, and fluorine resin. A particle of acrylic resin, acrylic-styrene resin, styrene resin, a cross-linked acrylic resin, or a cross-linked styrene resin is preferable, and a particle of acrylic resin is more preferable.

The polymer particle is suitably used in a polymer latex form.

A weight-average molecular weight of the polymer particle is preferably from 10,000 to 200,000, and more preferably from 100,000 to 200,000.

An average particle size of the polymer particle is preferably in a range of from 10 nm to 1 μm, more preferably in a range of from 10 nm to 200 nm, and still more preferably in a range of from 20 nm to 100 nm.

A glass transition temperature (Tg) of the polymer particle is preferably 50° C. or higher. By containing a polymer particle having a Tg of 50° C. or higher, the fixability of the ink composition to a recording medium and rubbing resistance can be effectively improved. The Tg of the polymer particle is more preferably from 50° C. to 180° C., and still more preferably from 70° C. to 170° C.

As the polymer particle, a self-dispersible resin particle (hereinafter, also referred to as "self-dispersible polymer particle") is preferably used.

Here, the self-dispersible polymer is a water-insoluble polymer that can get into, due to a functional group (particularly, an acidic group or a salt thereof) which the polymer itself has, a dispersion state in an aqueous medium when it is made into a dispersion state by a phase inversion emulsification method even in the absence of surfactants.

The scope of the term, "dispersion state", used herein includes both an emulsified state (emulsion) in which a water-insoluble polymer which is in the liquid particle state is dispersed in an aqueous medium and a suspended state (suspension) in which a water-insoluble polymer is dispersed in an aqueous medium in the solid particle state.

The expression that a polymer is "water-insoluble" means that an amount of the polymer which can be dissolved to 100 parts by mass of water at 25° C. is 5.0 parts by mass or less.

For a self-dispersible polymer particle, among self-dispersible polymer particles described in paragraphs 0090 to 0121 of JP-A-2010-64480 or paragraphs 0130 to 0167 described in JP-A-2011-068085, those having a Tg of from 80° C. to 150° C. may be selected and used.

Those described in paragraph 0141 of JP-A No. 2012-218840 can also be used.

<Solid Wetting Agent>

The ink composition of the present disclosure may contain a solid wetting agent.

In the present disclosure, the term "solid wetting agent" means a water-soluble compound which includes a water-retention function and which is solid at 25° C.

Since a solid wetting agent has a high moisture-retaining function, it can be suitably used in the ink composition of the present disclosure for the purpose of suppressing drying and solidification of the ink, which are undesirable.

For the solid wetting agent, one that is generally used for an aqueous ink composition can be utilized as it is. Specific examples of the solid wetting agent include polyhydric alcohols such as urea, urea derivatives, saccharides, sugar alcohols, hyaluronic acids, trimethylolpropane, and 1,2,6-hexane triol.

Examples of the urea derivatives include: a compound obtained by substituting hydrogen on nitrogen of urea with an alkyl group or alkanol; thiourea; and a compound obtained by substituting hydrogen on nitrogen of thiourea with an alkyl group or alkanol, and specific example of the urea derivatives include N,N-dimethyl urea, thiourea, ethylene urea, hydroxyethyl urea, hydroxybutyl urea, ethylene thiourea, and diethyl thiourea.

Examples of the saccharides include monosaccharides, disaccharides, oligosaccharides (including trisaccharide and tetrasaccharide) and polysaccharides, and specific examples of the saccharides include glucose, mannose, fructose, ribose, xylose, arabinose, galactose, aldonic acid, glucitol, maltose, cellobiose, lactose, sucrose, trehalose, and maltotriose. Here, the term "polysaccharide" means a sugar in a borad sense, and means a material such as alginic acid, α-cyclodextrin, or cellulose, which widely exists in the natural world. Examples of derivatives of such sugars include reducing sugar (for example, sugar alcohol), and oxidized sugar (for example, aldonic acid, uronic acid, amino acid, and thio sugar). In particular, sugar alcohol is preferable, and specific examples of the sugar alcohol include maltitol, sorbitol, and xylitol. For the hyaluronate, one that is commercially available as an aqueous solution containing 1% by mass of sodium hyaluronate aqueous solution (molecular weight 350,000) can be used.

From the viewpoint of improving water-holding property, a content of the solid wetting agent in the ink composition of the present disclosure is preferably from 1.0% by mass to 20.0% by mass, more preferably from 2.0% by mass to 15.0% by mass, and still more preferably from 3.0% by mass to 10.0% by mass based on the total amount of the ink composition.

Here, when two or more types of solid wetting agents are contained in the ink composition in the present disclosure, a total amount of the two or more types of solid wetting agents is within the above-described range.

<Water-Soluble Polymer Compound>

The ink composition of the present disclosure preferably contains at least one type of water-soluble polymer compound as needed. The water-soluble polymer compound is not particularly limited, and examples of the water-soluble polymer compound include a known water-soluble polymer compound such as polyvinyl alcohol, polyacrylamide, polyvinylpyrrolidone, or polyethylene glycol.

For the water-soluble polymer compound, a specific polymer compound which may be contained in the treatment liquid described below or a water-soluble polymer compound described in paragraphs 0026 to 0080 of JP-A No. 2013-001854 is suitable.

<Antifoaming Agent>

The ink composition of the present disclosure may contain at least one antifoaming agent as needed.

Examples of the antifoaming agent include a silicone compound (a silicone antifoaming agent), and a poloxamer compound (a poloxamer antifoaming agent), and among these, a silicone antifoaming agent is preferable.

For the silicone antifoaming agent, a silicone antifoaming agent including a polysiloxane structure is preferable. Examples of the poloxamer antifoaming agent include PLURONIC (trade name, BASF).

For the antifoaming agent, a commercially available product can be used.

Examples of the commercially available product include BYK-012, BYK-017, BYK-021, BYK-022, BYK-024, BYK-025, BYK-038, BYK-094 (all trade names, manufactured by BYK Japan KK), KS-537, KS-604, KM-72F (all trade names, manufactured by Shin-Etsu Chemical Co., Ltd.), TSA-739 (trade name, manufactured by Momentive Performance Materials Inc.), and OLFINE® AF104 (manufactured by Nissin Chemical Industry Co., Ltd.).

Among these, BYK-017, BYK-021, BYK-022, BYK-024, BYK-025, BYK-094, KS-537, KS-604, KM-72F, and TSA-739, which are silicone antifoaming agents, are preferable, and BYK-024 is most preferable from the viewpoint of jetting stability of the ink.

When the ink composition of the present disclosure contains an antifoaming agent, a content of the antifoaming agent is preferably from 0.0001% by mass to 1% by mass, and more preferably from 0.001% by mass to 0.1% by mass, with respect to the total amount of the ink composition.

<Colloidal Silica>

The ink composition of the present disclosure may contain colloidal silica as needed.

This can improve the stability of continuous jetting of an ink.

Colloidal silica is a colloid of fine particles of an inorganic oxide including silicon having an average particle size of several hundreds nm or smaller. Colloidal silica includes silicon dioxide (including a hydrate thereof) as its main component, and may further include aluminate (sodium aluminate, potassium aluminate or the like) as a small amount of component.

Colloidal silica may contain an inorganic salt such as sodium hydroxide, potassium hydroxide, lithium hydroxide, or ammonium hydroxide, or an organic salt such as tetramethyl ammonium hydroxide. Such an inorganic salt or organic salt functions, for example, as an stabilizer of the colloid.

For the colloidal silica, for example, a description in paragraphs 0043 to 0050 of JP-A No. 2011-202117 can be referred to as appropriate.

The ink composition of the present disclosure may contain an alkali silicate metal salt in place of the colloidal silica or in addition to the colloidal silica as needed. For the alkali silicate metal salt, a description of paragraphs 0052 to 0056 of JP-A No. 2011-202117 can be referred to as appropriate.

When the ink composition of the present disclosure includes colloidal silica, a content of the colloidal silica is preferably from 0.0001% by mass to 10% by mass, more preferably from 0.01% by mass to 3% by mass, still more preferably from 0.02% by mass to 0.5% by mass, and particularly preferably from 0.03% by mass to 0.3% by mass based on the total amount of the ink composition.

<Other Components>

The ink composition of the present disclosure may contain other components as needed.

Examples of the other components include known additives such as a polymerizable compound, a polymerization initiator, a polymer particle, a polymerization inhibitor, a dryness inhibitor (wetting agent), an anti-fading agent, an emulsion stabilizer, a penetration enhancing agent, an ultraviolet ray absorber, an antiseptic agent, an antimildew agent, a viscosity adjuster, a dispersion stabilizer, an antirust agent, or a chelating agent.

—Physical Properties of Ink Composition—

From the viewpoint of dispersion stability, the ink composition of the present disclosure preferably has, at 25° C. (±1° C.), a pH of 7.5 or higher, more preferably a pH of from 7.5 to 13, and still more preferably a pH of from 8 to 12.

When the ink composition has a pH of 7.5 or higher, the storage stability of the ink composition may be improved. The pH was measured by using a pH meter WM-50EG (trade name, manufactured by DKK-TOA CORPORATION) under an environment at 25° C.

When the ink composition of the present disclosure is used in an ink jet recording method, the surface tension of the ink composition is preferably from 20 mN/m to 60 mN/m from the viewpoint of jetting stability. The surface tension of the ink composition is more preferably from 20 mN/m to 45 mN/m, and still more preferably from 25 mN/m to 40 mN/m. For the surface tension, a value measured by the above-described known method is used.

A viscosity of the ink composition of the present disclosure at 30° C. is preferably from 1.2 mPa·s to 15.0 mPa·s, more preferably from 2 mPa·s to 13 mPa·s, and still more preferably from 2.5 mPa·s to 10 mPa·s.

For the viscosity of the ink composition, a value measured by VISCOMETER TV-22 (trade name, manufactured by Tokisangyo Co. Ltd.) under a condition of 30° C. is used.

The ink composition of the present disclosure can be used for ink jet recording or for textile, and is preferably used for ink jet recording among the above.

—Method of Producing Ink Composition—

A method of producing an ink composition of the present disclosure includes: a process of manufacturing a urethane resin which includes an alicyclic structure at a content of from 6000 mmol/kg to 12000 mmol by condensing all raw material monomers, 70 mol % or more of the all raw material monomers being a monomer having a content of an alicyclic structure of 30% by mass or more; and a process of preparing the ink composition by mixing the urethane resin, a water-soluble organic solvent, water, and a colorant.

The process of producing a urethane resin can be performed in a similar manner to the above-described production method of the urethane resin.

In the process of producing a urethane resin, preferably a polyol at least including an alicyclic structure and a polyisocyanate including an alicyclic structure are employed as monomers to be condensed.

<<Treatment Liquid>>

For the purpose of forming an aggregate of the ink composition of the present disclosure, a treatment liquid may be used.

By using a treatment liquid, In a case in which an image is formed on a coating paper by an ink jet recording method using the ink composition, a mottle can be inhibited.

Herein, the term "mottle" means that an unintended shading (for example, shading in a solid image) appears as an unevenness due to a local decrease of a white background portion, and it is a phenomenon of a rough appearance of half tone area, which is an area between an area where an image is bright (highlight) and a dark area (shadow) due to uneven distribution of a portion where the density of an ink composition is high and a portion where the density of an ink composition is low in the half tone area.

The mottle is not a phenomenon which occurs due to a local aggregation insufficiency of an ink composition such as a conventional "blur" or "streak", but a phenomenon caused by non-uniform aggregation of an ink composition due to ununiform distribution of a treatment liquid on a recording medium.

The treatment liquid preferably contains an acidic compound. Examples of the acidic compound include an acidic material which can lower the pH of an ink composition.

Preferable examples of the acidic material include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumarinic acid, thiophencarboxylic acid, nicotinic acid, derivatives of these compounds. and salts thereof.

The acidic materials may be used singly, or two or more of the acidic materials may be used in combination.

When the treatment liquid contains an acidic material, the pH (25° C.) of the treatment liquid is preferably 6.0 or lower, and more preferably 4.0 or lower. The pH (25° C.) is more preferably in a range of from 0.1 to 4.0, and particularly preferably from 0.1 to 0.5. In this case, the pH (25° C.) of the ink composition is preferably from 7.5 to 13.0, and more preferably from 8.0 to 12.0.

In particular, in a case in which the pH of the treatment liquid is from 0.1 to 4.0, the ink composition of the present disclosure can be more likely to be uniformly aggregated, and thus the mottle of an image to be formed can be more inhibited.

From the viewpoint of image density, resolution, and increasing of ink jet recording speed, the pH (25° C.) of the ink composition is preferably from 8.0 to 12.0, and the pH (25° C.) of the treatment liquid is preferably from 0.1 to 0.5. The pH is a value which is measured by using a pH meter WM-50EG (trade name, manufactured by DKK-TOA CORPORATION) under an environment of 25° C.

As the aggregation component in the present disclosure, an acidic material which is highly soluble to water is preferable, and from the viewpoint of increasing aggregation performance and fixation of the ink in the entire, an organic acid is preferable, a di- or higher-valent organic acid is more preferable, and an acidic material having a valency of from two to three is particularly preferable. As the di- or higher-valent organic acid, an organic acid having a first pKa of 3.5 or lower is preferable, and an organic acid having a first pKa of 3.0 or lower is more preferable. Specific preferable examples of the di- or higher-valent organic acid include phosphoric acid, oxalic acid, malonic acid, and citric acid.

(Water-Soluble Polymer Compound)

The treatment liquid may contain at least one type of a water-soluble polymer compound.

The water-soluble polymer compound is not particularly limited, and a known water-soluble polymer compound such as polyvinyl alcohol, polyacrylamide, polyvinylpyrrolidone, or polyethylene glycol can be used.

As the water-soluble polymer compound, a specific polymer compound described below, a water-soluble polymer compound described in paragraphs 0026 to 0080 of JP-A No. 2013-001854 and the like are also suitable.

A weight-average molecular weight of the water-soluble polymer compound is not particularly limited, and the weight-average molecular weight may be, for example, from 10,000 to 100,000, and is preferably from 20,000 to 80,000, and more preferably from 30,000 to 80,000. The weight-average molecular weight is a value measured by the above-described method.

A content of the water-soluble polymer compound in the treatment liquid is not particularly limited, and is preferably from 0.1% by mass to 10% by mass, more preferably from 0.1% by mass to 4% by mass, still more preferably from 0.1% by mass to 2% by mass, and particularly preferably from 0.1% by mass to 1% by mass, based on a total amount of the treatment liquid.

When the content is 0.1% by mass or larger, spreading of an ink droplet can be more accelerated, and when the content is 10% by mass or smaller, increase of the viscosity of the treatment liquid can be more suppressed. When the content is 10% by mass or smaller, coating unevenness of the treatment liquid caused by a bubble in the treatment liquid can be suppressed.

As the water-soluble polymer compound, a polymer compound including a hydrophilic structural unit having an ionic group (preferably an anionic group), which is hereinafter also referred to as "specific polymer compound", is preferable. This can further accelerate spreading of an ink droplet applied to a recording medium, and further suppresses the roughness of an image.

Examples of the ionic group of the specific polymer compound include a carboxyl group, a sulfonic acid group, a phosphoric acid group, a boronic acid group, an amino group, an ammonium group, and a salt thereof. Among these, a carboxyl group, a sulfonate group, a phosphate group, and a salt thereof is preferable, a carboxyl group, a sulfonate group, and a salt thereof is more preferable, and a sulfonate group and a salt thereof is still more preferable.

As the hydrophilic structural unit having an ionic group (preferably an anionic group), a structural unit derived from a (meth) acrylamide compound having an ionic group (preferably an anionic group) is preferable.

A content of the hydrophilic structural unit having an ionic group (preferably an anionic group) in the water-soluble polymer compound may be, for example, from 10% by mass to 100% by mass, and is preferably from 10% by mass to 90% by mass, more preferably from 10% by mass to 70% by mass, still more preferably from 10% by mass to 50% by mass, and particularly preferably from 20% by mass to 40% by mass, based on the total mass of the water-soluble polymer compound.

The specific polymer compound preferably includes at least one type of a hydrophobic structural unit in addition to at least one type of the above-described hydrophilic structural unit having an ionic group (preferably an anionic group, particularly preferably a sulfonate group). When a hydrophobic structural unit is contained, the specific polymer compound is more likely to exist on the surface of the treatment liquid, and therefore, spreading of an ink droplet applied to a recording medium may be more accelerated, and further suppresses the roughness of an image.

As the hydrophobic structural unit, a structural unit derived from a (meth)acrylic acid ester (preferably, an ester of a (meth)acrylic acid and an alkyl which has the number of carbon atoms of from 1 to 4) is preferable.

A content of the hydrophobic structural unit in the specific polymer compound may be, for example, from 10% by mass to 90% by mass, and is preferably from 30% by mass to 90% by mass, more preferably from 50% by mass to 90% by mass, and particularly preferably from 60% by mass to 80% by mass, based on a total mass of the specific polymer compound.

(Water)

The treatment liquid can contain water.

A content of water in the treatment liquid is not particularly restricted, and is preferably in a range from 10% by mass to 99% by mass, more preferably in a range from 50% by mass to 90% by mass, and still more preferably in a range from 60% by mass to 80% by mass, with respect to a total mass of the treatment liquid.

(Organic Solvent)

The treatment liquid preferably contains at least one selected from organic solvents.

For the organic solvent, an organic solvent similar to the water-soluble solvent which may be contained in the ink composition can be used. From the viewpoint of suppressing curling, polyalkylene glycol and derivatives thereof are preferable, and at least one selected from the group consisting of diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol is more preferable.

Although a content of the organic solvent in the treatment liquid is not particularly restricted, from the viewpoint of suppressing curling, the content is preferably from 1% by mass to 30% by mass, and more preferably from 5% by mass to 15% by mass, based on a total mass of treatment liquid.

(Antifoaming Agent)

The treatment liquid may contain at least one antifoaming agent as needed.

Examples of the antifoaming agent which can be contained in the treatment liquid include an antifoaming agent similar to the antifoaming agent, which can be contained in the ink composition.

When the treatment liquid contains an antifoaming agent, the content of the antifoaming agent is preferably from 0.0001% by mass to 1% by mass, and more preferably from 0.001% by mass to 0.1% by mass, based on the total amount of the treatment liquid.

The treatment liquid can further contain an additives as an additional component as long as it does not impair the effect of the present disclosure. Examples of the additional additive include known additives such as a polymerization initiator, a dryness inhibitor (a wetting agent), an anti-fading agent, an emulsion stabilizer, a penetration enhancing agent, an ultraviolet ray absorber, an antiseptic agent, an antimildew agent, a pH regulator, a surface tension regulator, an antifoaming agent, a viscosity adjuster, a dispersant, a dispersion stabilizer, an antirust agent, or a chelating agent.

<<Image Forming Method>>

The image forming method of the present disclosure includes an ink applying process in which an image is formed by applying the above-described ink composition to a recording medium by an ink jet method.

According to the image forming method of the present disclosure, an image attaining both heat resistance and blocking resistance can be obtained.

The image forming method of the present disclosure may include, in addition to the ink applying process, a treatment liquid applying process in which a treatment liquid is applied to a recording medium.

<Ink Applying Process>

In the ink applying process, the above-described ink composition is applied to a recording medium by an ink jet method. In the present process, an ink composition can be selectively applied on a recording medium, thereby forming a desired visible image. Details of the ink composition such as a preferred embodiment thereof are as described in the description about the ink composition.

In the image formation by an ink jet method, the above-described ink composition is jetted onto a desired recording medium by providing an energy to form a color image. As a preferable ink jet method in the present disclosure, a method described in paragraphs 0093 to 0105 of JP-A No. 2003-306623 can be employed.

The inkjet method is not particularly limited and may be any known methods such as a charge-control method in which ink is jetted by means of electrostatic attraction; a drop-on-demand method (pressure-pulse method) in which an oscillating pressure of piezo elements is utilized; an acoustic inkjet method in which ink is jetted by radiation pressure by irradiating ink with acoustic beams that have been converted from electric signals; and a thermal inkjet method in which a pressure generated by heating ink to form bubbles therein (BUBBLEJET®). One effective inkjet method is described in JP-A No. S54-59936, in which ink is jetted from a nozzle by an acting force due to a rapid change in volume of ink caused by applying thermal energy to the ink.

The inkjet method includes a method in which an ink with a low density called a photo ink is jetted in a large number but each jetting is performed at a small amount; a method in which inks of substantially same color hue in different densities are used to improve the image quality; and a method in which a clear and colorless ink is used.

The inkjet head may be that for a shuttle system, in which recording is carried out while a short serial head is moved in the width direction of a recording medium, or that for a line system in which a line head at which recording elements are arranged so as to correspond to the entire length of one side of the recording medium. In the line system, an image can be recorded on the entire surface of a recording medium by simply moving the recording medium in the direction perpendicular to the direction in which the recording elements are arranged, and a transfer system such as a carriage for scanning a short serial head is unnecessary. Since only the recording medium is moved, and complex regulation of scanning of carriage transfer band a recording medium are unnecessary, recording at a recording speed higher than that in the shuttle system can be achieved. The image forming method of the present disclosure provides larger improvements in the jetting accuracy and the rubbing resistance when applied to the line system which does not perform dummy jetting in general, while the image forming method of the present disclosure may be applied to both of the above systems.

From the viewpoint of obtaining a high resolution image, an amount of an ink droplet jetted form an ink jet head is preferably from 1 pl to 10 pl (pico liter), and more preferably from 1.5 pl to 6 pl. From the viewpoint of improving evenness and a connection of continuous tone of an image, it is effective to use a combination of liquid droplets having different droplet volumes from each other, and the present disclosure can also be suitably used in such a case.

In the image forming method of the present disclosure, a method of jetting an ink composition to a recording medium is preferably a "superdrop" system, since an effect of the ink set of the present disclosure may become miximum. The ink jet method relating to the "superdrop" system is described, for example, in JP-A No. 2006-188043.

<Treatment Liquid Applying Process>

The image forming method of the present disclosure may include a treatment liquid applying process in which a treatment liquid is applied to a recording medium.

In the treatment liquid applying process, a treatment liquid including an acidic compound which aggregates a component in the ink composition is applied to a recording medium to be in contact with the ink composition, thereby forming an image. In this case, the urethane resin in the ink composition aggregates and an image is fixed onto the recording medium. The treatment liquid contains at least an aggregation component, and details of each component and preferred embodiments are as described above.

The application of the treatment liquid can be performed by employing a known method such as a coating method, an inkjet method, or a dipping method. The coating method may be a known coating method using, for example, a bar coater, an extrusion die coater, an air doctor coater, a blade coater, a rod coater, a knife coater, a squeeze coater, or a reverse roll coater. Details of the inkjet method are described above.

The treatment liquid applying process may be provided either before or after the ink applying process which uses the ink composition. In the present disclosure, an embodiment in which the ink applying process is provided after the treatment liquid applying process is preferable.

Specifically, an embodiment in which a treatment liquid is applied in order to aggregate a component (the above-described dispersion particle) in the ink composition in advance before the ink composition is applied on a recording medium, and the ink composition is applied to be in contact with the treatment liquid, which has been applied on the recording medium, to form an image is preferable. This can speed up ink jet recording, and an image with a high density and a high resolution can be obtained even when a high speed recording is performed.

An amount of the treatment liquid to be applied is not particularly restricted as long as the ink composition can be aggregated, and can be preferably an amount in which the amount of the aggregation component to be applied is 0.1 g/m$^2$ or larger. An amount in which the amount of the aggregation component to be applied is from 0.2 g/m$^2$ to 2.0 g/m$^2$ is preferable. When the amount of the aggregation component to be applied is 0.1 g/m$^2$ or larger, a favorable high speed aggregation performance can be maintained in accordance with respective embodiments of applications of the ink composition. The amount of the aggregation component to be applied of 2.0 g/m$^2$ or smaller is preferable in terms of avoiding impairing (such as changing the gloss or the like of) the surface properties of the recording medium on which the aggregation component has been applied.

In the present disclosure, it is preferable that an ink applying process is provided after the treatment liquid applying process, and a heat-drying process, in which the treatment liquid on a recording medium is heat-dried, is further provided after the treatment liquid is applied on a recording medium but before the ink composition is applied. By heat-drying the treatment liquid before the ink applying process, ink coloring property such as blur suppression becomes favorable, and a visible image having favorable color density and hue can be recorded.

The heat-drying may be conducted by using a known heating device such as a heater, a blowing device utilizing air blow such as a dryer, or a combination thereof. The heating may be performed according to, for example, a method of applying heat, by using a heater or the like, from a side of the recording medium opposite to the face applied with the treatment liquid, a method of blowing warm or hot air to the face of the recording medium applied with the treatment liquid, or a method of heating by using an infrared heater. Two or more of these methods may be combined and used for the heating.

<Recording Medium>

The ink jet recording method of the present disclosure is a method in which an image is recorded on a recording medium. The recording medium is not particularly restricted, and examples of the recording medium include a cellulose-based general printing paper, such as a high-quality paper, a coat paper, or an art paper, a matte paper, and a cardboard, which are used for general offset printing. When image recording on the cellulose-based general printing paper is performed by a general ink jet method using an aqueous ink, absorption and drying of the ink is relatively slow, colorant migration easily occurs after jetting, and image quality is likely to deteriorate. In contrast, according to the ink jet recording method of the present disclosure, the migration of the colorant can be suppressed and a high-quality image having excellent color density and hue can be recordedt.

Any recording medium that is commercially available in general may be used as the recording medium. Examples of the recording medium include a high quality paper (A) such as "OK PRINCE HIGH QUALITY" (trade name, manufactured by Oji Paper Co., Ltd.), "SHIORAI" (trade name, manufactured by Nippon Paper Industries Co., Ltd.), or "NEW NPI HIGH QUALITY" (trade name, manufactured by Nippon Paper Industries Co., Ltd.); a finely coated paper such as "OK EVER LIGHT COAT" (trade name, manufactured by Oji Paper Co., Ltd.) or "AURORA S" (trade name, manufactured by Nippon Paper Industries Co., Ltd.); a lightweight coated paper (A3) such as "OK COAT L" (trade name, manufactured by Oji Paper Co., Ltd.) or "AURORA L" (trade name, manufactured by Nippon Paper Industries Co., Ltd.); a coated paper (A2, B2) such as "OK TOP-COAT+" (trade name, manufactured by Oji Paper Co., Ltd.) or "AURORA COAT" (trade name, manufactured by Nippon Paper Industries Co., Ltd.); an art paper (A1) such as "OK KANEFUJI+" (trade name, manufactured by Oji Paper Co., Ltd.) and "TOKUBISHI ART" (trade name, manufactured by Mitsubishi Paper Mills, Ltd.); a matte paper (A2) such as "NEW AGE" manufactured by Oji Paper Co., Ltd., "OK TOP COAT MATTE", "U-light" manufactured by Nippon Paper Industries Co., Ltd., "NEW V MATTE" manufactured by Mitsubishi Paper Mills, Ltd., "RAICHO MATTE COAT N" manufactured by Chuetsu Pulp & Paper Co., Ltd.; or a cardboard such as "I-BEST" manufactured by Nippon Daishowa Paperboard Co., Ltd., "PERFECT W" manufactured by Hokuetsu Kishu Paper Co., Ltd., "BON IVORY +" manufactured by Oji Paper Co., Ltd., "OK PLOW" manufactured by Oji Paper Co., Ltd., "F-1 CARD" manufactured by Nippon Daishowa Paperboard Co., Ltd., "NOBACK W" manufactured by HOKUETSU KISHU PAPER Co., Ltd., "HI LUCKY" manufactured by Hokuetsu Kishu Paper Co., Ltd., "OK L CARD" manufactured by Oji Paper Co., Ltd., "PEARL DELUXE" manufactured by Mitsubishi Paper Mills, Ltd., "PC GREEN 100" manufactured by Oji Paper Co., Ltd., "NEW DV" manufactured by Hokuetsu Kishu Paper Co., Ltd., "MARICOAT" manufactured by HOKUETSU KISHU PAPER Co., Ltd., or "UF COAT" manufactured by Oji Paper Co., Ltd. (all trade names).

Various papers exclusive for a photographic use intended for ink jet recording may also be used.

<Ink Jet Recording Apparatus>

An image forming apparatus which can be used for an image forming method of the present disclosure is not particularly restricted, and an image forming apparatus provided with a jet head which jets on a recording medium by the superdrop method, for example, a known image forming apparatus described in JP-A No. 2012-11585, JP-A No. 2012-250477, or the like can be used.

The image forming apparatus is preferably provided with a unit which radiates an active energy ray (for example, an ultraviolet ray). For the configuration of units such as the active energy ray irradiation unit, a known configuration described in JP-A No. 2011-184628 or the like can be referred to as appropriate.

One example of the inkjet recording apparatus applicable to the image recording method of the present disclosure will be explained in detail with reference to FIG. 1. FIG. 1 is a schematic view showing an entire configuration of an inkjet recording apparatus.

As shown in the FIGURE, the inkjet recording apparatus includes a treatment liquid application unit 12, having a treatment liquid jet head 12S that jets the treatment liquid; a treatment liquid drying zone 13, having a heating unit (not shown) that dries the treatment liquid; and an ink jetting unit 14 that jets respective inks; and an ink drying zone 15 at which the jetted ink is dried. Optionally, an image fixation unit (not shown) equipped with an ultraviolet ray-irradiating lamp may be provided downstream of ink drying zone 15 in a direction of delivery of recording media.

The recording medium that has been supplied to the inkjet recording apparatus is delivered by delivery rollers from a feed section in which recording media are stored to a storage section, through treatment liquid application unit 12, treatment liquid drying zone 13, ink jetting unit 14, ink drying zone 15, and optionally image fixation unit 16 in this order. The delivery of the recording medium may be conducted by a method using a drum-shaped member or a belt-shaped member, or a method using a stage, in place of the method using delivery rollers.

The delivery rollers may include at least one drive roller that is rotated by the force of a motor (not shown). By rotating the drive roller at a constant rate, recording media can be delivered in an expected direction, in an expected delivery amount.

Treatment liquid application unit 12 has treatment liquid jet head 12S, which jets the treatment liquid from nozzles positioned to face the recording side of a recording medium so that the treatment liquid can be applied onto the recording medium in the form of droplets. The treatment liquid application unit 12 is not limited to one that for a method of jetting the composition from a head in the form of a nozzle, but may be one that for a method of coating the composition by a coating roller. According to the coating method, the treatment liquid may be readily applied to the almost entire area of recording side of the recording medium, including an image portion to which ink droplets is to be applied by ink jetting unit 14. In order to apply the treatment liquid to the recording medium with a uniform thickness, an air-knife may be used for the coating or a member having an acute angle may be positioned with a gap corresponding to an expected amount of treatment liquid, between the member and the recording medium.

Treatment liquid drying zone 13 is positioned downstream of treatment liquid application unit 12 in a delivery direction of the recording medium. Treatment liquid drying zone 13 may include known heating means such as a heater or air blower such as a drier, or a combination thereof. The heating may be conducted by: heating the side of recording medium opposite to the treatment liquid application side thereof by a heater or the like that is positioned, for example, under a delivery system that delivers the recording medium positioned thereon when he recording medium is automatically delivered; blowing the treatment liquid application side of the recording medium with warm or hot air; or using an infrared heater. These methods may be used alone of in combination.

Since the surface temperature of the recording medium may change according to the type of recording medium (material, thickness or the like) or environmental temperature, it is preferable to apply the treatment liquid application while controlling the surface temperature of the recording medium by a system including a measurement section that measures the surface temperature of the recording medium and a control section that feedbacks to a heating controlling section the temperature measured by the measurement section. The measurement section for measuring the surface temperature of the recording medium is preferably a contact-type or non-contact type thermometer.

In embodiments, solvent removal may be performed by using a solvent-removing roller. Alternatively, a method in which the excess solvent is removed by an air knife is also applicable.

Ink jetting unit 14 is positioned downstream of treatment liquid drying zone 13 in a delivery direction of the recording medium Ink jetting unit 14 includes recording heads (ink jet heads) 30K, 30C, 30M and 30Y, each connecting to an ink reservoir that stores ink of black (K), cyan (C), magenta (M) or yellow (Y) (not shown). Each ink reservoir stores an ink composition containing a pigment of corresponding color, polymer particles, water-soluble solvent and water, and supplies the ink to ink jet heads 30K, 30C, 30M and 30Y upon recording of an image. Further, as shown in FIG. 1, the recording apparatus may include recording heads 30A and 30B for jetting ink having a specific color.

Ink jet heads 30K, 30C, 30M and 30Y jet inks of respective colors corresponding to the image to be formed, through jetting nozzles that are positioned so as to face the recording side of recording medium. In this way, ink of each color can be applied to the recording side of recording medium to form a color image.

Treatment liquid jet head 12S and ink jet heads 30K, 30C, 30M, 30Y, 30A and 30B are in the form of full-line head in which a number of nozzles are aligned in a maximum recording width direction of the image to be formed on the recording medium. In this form, image recording can be carried out at higher speed compared to serial-type recording in which recording is carried out by a short-length shuttle head scanning in a width direction of the recording medium (in a direction perpendicular to a delivery direction of the recording medium). In the present disclosure, any recording methods are applicable such as the serial-type recording or other methods in which the recording is performed at a relatively high speed, including a single-path recording in which a line is formed at a single round of scanning in a main-scanning direction. In the image recording method of the present disclosure, a high-quality image having high reproducibility may be obtained even in the single-path system.

In the present embodiment, treatment liquid jet head 12S and ink jet heads 30K, 30C, 30M, 30Y, 30A and 30B are described as having the same structure.

An application amount of the treatment liquid and an application amount of the ink composition may be adjusted as appropriate. For example, the amount of treatment liquid may be changed in order to adjust the properties such as viscoelasticity of the aggregation formed upon mixing of the treatment liquid and the ink composition, according to the type of the recording medium.

Ink drying zone 15 is positioned downstream of ink jetting unit 14 in a delivery direction of the recording medium Ink drying zone 15 may have a similar structure to that of treatment liquid drying zone 13.

The inkjet recording apparatus may further include a heating unit on the delivery path from the feed section to the storage section, in order to conduct a heat treatment to the recording medium. For example, by providing a heating means to a desired position, such as upstream of treatment liquid drying zone 13 or between ink jetting unit 15 and ink drying zone 15, the temperature of the recording medium can be increased to effectively perform drying and/or fixation of the recording medium.

EXAMPLES

In the following, the present disclosure will be described in further details with reference to Examples. However, the present disclosure is not limited to Examples as long as the gist of the invention is retained. The term "part" refers to "part by mass" unless otherwise noted.

<<Preparation of Ink Composition>>
<Synthesis of Water-Soluble Polymeric Dispersant Q-1>

A monomer supplying composition was prepared by mixing methacrylic acid (172 parts), benzyl methacrylate (828 parts), and isopropanol (375 parts). An initiator supplying composition was prepared by mixing 2,2-azobis (2-methylbutyronitrile) (22.05 parts) and isopropanol (187.5 parts).

Next, isopropanol (187.5 parts) was heated to 80° C. under nitrogen atmosphere, and a mixture of the above-described monomer supplying composition and the above-described initiator supplying composition was added dropwise thereto over two hours. After the addition, the mixture was further maintained at 80° C. for four hours, and cooled to 25° C.

After cooling, by removing the solvent under reduced pressure, a water-soluble polymeric dispersant Q-1 having a weight-average molecular weight of about 30,000, and an acid value of 112 mgKOH/g was obtained.

<Production of Cyan Pigment Dispersion C-1>

0.8 eq of methacrylic acid in the above obtained water-soluble polymeric dispersant Q-1 (150 parts) was neutralized with potassium hydroxide aqueous solution, and then adjusted such that a concentration of the water-soluble polymeric dispersant is 25% by mass by further adding ion exchanged water, thereby obtaining an aqueous solution containing water-soluble polymeric dispersant.

The aqueous solution containing water-soluble polymeric dispersant (124 parts), Pigment Blue 15:3 (cyan pigment) (48 parts), water (75 parts), and dipropylene glycol (30 parts) were mixed, and the mixture was subjected to dispersing with a bead mill (bead diameter: 0.1 mm, zirconia bead) until a desired volume average particle size was obtained, whereby a dispersion of a polymer-coated cyan pigment particle having a pigment concentration of 15% (non-cross-linked dispersion) was obtained.

To the non-cross-linked dispersion (136 parts), DENA-COL® EX-321 (manufactured by Nagase ChemteX Corporation, cross-linking agent) (1.3 parts), and an aqueous boric-acid solution (boric acid concentration: 4 mass %) (14.3 parts) were added, and the mixture was reacted at 50° C. for 6 and a half hours, then cooled to 25° C., thereby obtaining a cross-linked dispersion.

Next, to the obtained cross-linked dispersion, ion exchanged water was added, and by using STIRRING-TYPE ULTRA-HOLDER (manufactured by Advantec Toyo Co. Ltd.) and an ultrafiltration membrane (trade name: Q0500076E ULTRAFILTER, manufactured by Advantec Toyo Co. Ltd., fraction molecular weight: 50,000), purification is performed by ultrafiltration such that the concentration of dipropylene glycol in the dispersion was 0.1 mass % or lower, then concentrating was performed until the concentration of the pigment was 15 mass % to thereby obtain a cyan pigment dispersion C-1.

A pigment contained in the cyan pigment dispersion C-1 is a polymer-coated pigment, which has a surface coated with a cross-linked polymer, that is the water-soluble polymeric dispersant Q-1 cross-linked by the cross-linking agent.

(Production of Urethane Resin 1)

In a pressure polymerizer provided with a thermometer and a stirrer, 45 parts of 4,4'-methylenebis (cyclohexyl isocyanate), 45 parts of 4,4'-(propane-2,2'-di-yl) dicyclohexanol, 10 parts of 2,2-bis(hydroxymethyl) butyric acid, and 110 parts of methyl ethyl ketone were placed, and the reaction system was replaced with a nitrogen gas, and then reacted for seven hours to obtain a solution of a urethane resin 1. The obtained solution was cooled to room temperature, and 31.5 parts of sodium hydroxide was added thereto, and then 1400 parts of ion exchanged water was added thereto, followed by evaporating methyl ethyl ketone under reduced pressure to obtain an aqueous dispersion of the urethane resin 1 having a solid content of 25% by mass.

(Production of Urethane Resins 2 to 14)

Aqueous dispersions (each having a solid content of 25.0% by mass) of urethane resins 2 to urethane resin 14 were produced in a similar manner to the preparation of the urethane resin 1 except that the formulation was changed to the formulation of the raw material monomer described in Table 1 below.

Details and structure of raw material monomers in Table 1 are as follows.

Polyisocyanate 1: 4,4'-methylenebis (cyclohexyl isocyanate)

Polyisocyanate 2: 1,5-diisocyanate decalin

Polyisocyanate 3: 1,5-diisocyanate naphthalene

Polyisocyanate 4: isophorone diisocyanate

Polyol 1: 4,4'-(propane-2,2'-di-yl) dicyclohexanol

Polyol 2: 1,4-cyclohexanedimethanol

Polyol 3: octahydro-1H-(4,7-methanoindene-2,5-di-yl) dimethanol

Polyol 4: polyether polyol (trade name: PTMG2000, manufactured by Hodogaya Chemical Co., Ltd.)

Polyol 5: 2,2-bis(hydroxymethyl butyric acid)

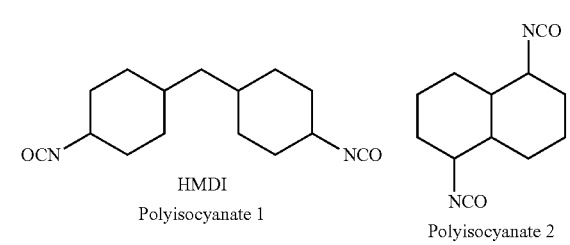

TABLE 1

| | Molecular weight | Content of Alicyclic structure in Monomer (%) | Urethane resin 1 | Urethane resin 2 | Urethane resin 3 | Urethane resin 4 | Urethane resin 5 | Urethane resin 6 | Urethane resin 7 |
|---|---|---|---|---|---|---|---|---|---|
| Polyisocyanate 1 | 262 | 64.2 | 40.2 | 31.1 | 32.7 | | | 46.5 | 40.2 |
| Polyisocyanate 2 | 204 | 67.8 | | | | | 46.4 | | |
| Polyisocyanate 3 | 210 | 0.0 | | | | | | | |
| Polyisocyanate 4 | 222 | 37.8 | | | | 48.2 | | | |
| Polyol 1 | 240 | 70.1 | 44.0 | | | 44.6 | 39.4 | 33.9 | 44.0 |
| Polyol 2 | 144 | 58.3 | | 56.6 | | | | | |
| Polyol 3 | 196 | 69.4 | | | 60.1 | | | | |
| Polyol 4 | 2000 | 0.0 | | | | | | 1.4 | |
| Polyol 5 | 148 | 0.0 | 15.8 | 12.2 | 7.2 | 7.2 | 14.2 | 18.3 | 15.8 |
| Alicyclic structure [mmol/kg] | | | 7180.5 | 6551.0 | 11455.3 | 6110.9 | 8161.8 | 6242.7 | 7180.5 |
| Amount of monomer having a content of alicyclic structure of 30% or more [mol %] | | | 84 | 88 | 93 | 93 | 86 | 80 | 84 |

| | Molecular weight | Content of Alicyclic structure in Monomer (%) | Urethane resin 8 | Urethane resin 9 | Urethane resin 10 | Urethane resin 11 | Urethane resin 12 | Urethane resin 13 | Urethane resin 14 |
|---|---|---|---|---|---|---|---|---|---|
| Polyisocyanate 1 | 262 | 64.2 | 40.2 | 40.2 | | 40.2 | 40.2 | 43.3 | 32.2 |
| Polyisocyanate 2 | 204 | 67.8 | | | | | | | |
| Polyisocyanate 3 | 210 | 0.0 | | | 32.9 | | | | |
| Polyisocyanate 4 | 222 | 37.8 | | | | | | | |
| Polyol 1 | 240 | 70.1 | 44.0 | 44.0 | | 44.0 | 44.0 | 35.5 | |
| Polyol 2 | 144 | 58.3 | | | | | | | |
| Polyol 3 | 196 | 69.4 | | | 60.4 | | | | 66.3 |
| Polyol 4 | 2000 | 0.0 | | | | | | 2.1 | |
| Polyol 5 | 148 | 0.0 | 15.8 | 15.8 | 6.7 | 15.8 | 15.8 | 19.1 | 1.5 |
| Alicyclic structure [mmol/kg] | | | 7180.5 | 7180.5 | 6113.4 | 7180.5 | 7180.5 | 5841.4 | 12143.2 |
| Amount of monomer having a content of alicyclic structure of 30% or more [mol %] | | | 84 | 84 | 60 | 84 | 84 | 79 | 99 |

The numerical value of each monomer (polyisocyanates 1 to 5 and polyols 1 to 5) in the section of urethane resins 1 to 14 represents the molar content (mol %) based on the total raw material monomers of the urethane resin.

-continued

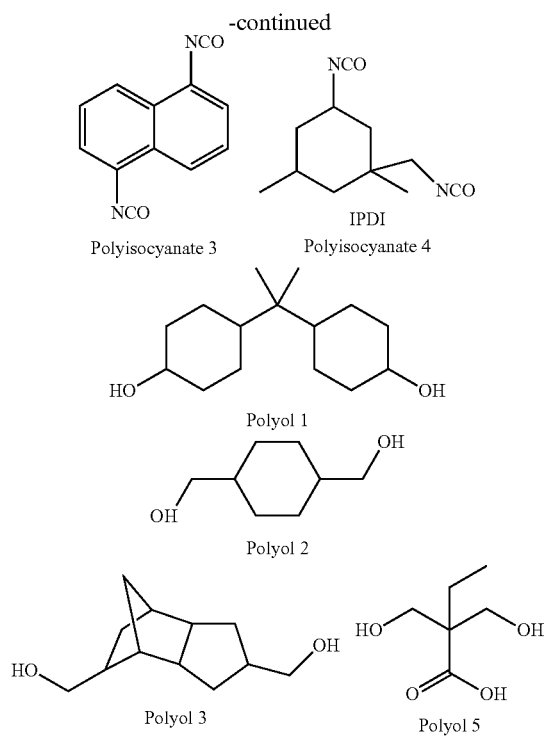

Example 1

Production of Ink Composition

The formulation below was mixed and filtered by a glass filter (trade name: GS-25, manufactured by ADVANTEC Corporation) and then, the resultant was filtered by a filter manufactured by Millipore corporation (PVDF membrane, pore size 5 μm) to produce a cyan ink.

—Formulation of Ink Composition—

| | |
|---|---|
| The cyan pigment dispersion C-1 (pigment concentration: 12% by mass) | 19.0 parts |
| Urea (wetting agent) | 5 parts |
| OLFINE ® E1010 (manufactured by Nissin Chemical Industry Co., Ltd., surfactant) | 1 part |
| Water-soluble organic solvent listed in Table 2 below | 2 parts |
| Potassium Nitrate | 0.05 parts |
| SEROZOL 524 (trade name, manufactured by Chukyo Yushi Co., Ltd., wax) | 2 parts |
| Aqueous dispersion of urethane resin 1 (solid content 25.0% by mass) | 32 parts |
| Ion exchanged water | Balance up to 100 parts in total |

Examples 2 to 12, Comparative Example 1 to 2

Ink compositions of Examples 2 to 12 and Comparative Examples 1 to 2 were prepared in a similar manner to Example 1, except that the urethane resin 1 and the type and the addition amount of the water-soluble organic solvent used in Example 1 were changed to the urethane resins 2 to 14 and the type and addition amount of the water-soluble organic solvent were changed as listed on Table 2.

<<Preparation of Treatment Liquid>>

The component of the formulation below was mixed to prepare a treatment liquid. The pH of the treatment liquid was 1.1. The measurement of pH was performed by the above-described method.

—Formulation of Treatment Liquid—

| | |
|---|---|
| Malonic acid (manufactured by Wako Pure Chemical Industries, Ltd.) | 25% by mass |
| Diethylene glycol monomethyl ether (manufactured by Wako Pure Chemical Industries, Ltd.) | 20% by mass |
| EMULGEN P109 (trade name, manufactured by Kao Corporation, nonionic surfactant) | 1% by mass |
| Ion exchanged water | 54% by mass |

<<Image Formation (Ink Jet Recording)>>

First, as shown in the FIGURE, an ink jet recording apparatus in which a treatment liquid applying unit 12 provided with a treatment liquid jet head 12S which jets a treatment liquid, a treatment liquid drying zone 13 which dries an applied treatment liquid, an ink jetting unit 14 which jets respective ink compositions, and an ink drying zone 15 which dries a jetted ink composition are arranged sequentially in this order in a direction (an arrow direction in the figure) in which a recording medium was prepared. Although not shown, the treatment liquid drying zone 13 was provided with an air blowing unit which performs drying by blowing a drying air to the recording surface side of the recording medium and an infrared heater at the non-recording surface side of the recording medium, so as to evaporate (dry) 70% by mass or more of the water in the treatment liquid by adjusting the temperature and the amount of air until 900 msec has passed after starting application of the treatment liquid. In addition, the ink jetting unit 14 was a full-line head (driving frequency: 25 kHz) for the superdrop method on which a black ink jet head 30K, a cyan ink jet head 30C, a magenta ink jet head 30M, and an yellow ink jet head 30Y are arranged and where each head has a width of 1200 dpi/10 inches and is able to record by jetting each color with a single pass in the main scanning direction.

The treatment liquid was filled into a storage tank (not illustrated) connected to the treatment liquid jet head 12S, and the ink composition of Examples 1 to 12 and Comparative Examples 1 to 2 were filled into a storage tank (not illustrated) connected to the cyan ink jet head 30C, and the treatment liquid and the ink composition were jetted in this order to form an image.

An application amount of the treatment liquid to a recording medium was 1.5 ml/m$^2$.

As the recording medium, OK TOP COAT MATTE (trade name, manufactured by Oji Paper Co., Ltd., basis weight: 104.7 g/m$^2$) was used.

In the image formation, the cyan ink were jetted from the head at a resolution of 1200 dpi (dots per inch)×1200 dpi and an ink droplet amount of 2.4 pl.

In the formation of the image below, the treatment liquid and the cyan ink were applied successively on a sample obtained by cutting the recording medium into A5 size to form an image.

Specifically, the formation of an image was performed as follows.

First, after the treatment liquid was jetted (applied) on the recording medium by a single pass from the treatment liquid jet head 12S, drying of the treatment liquid was performed using the treatment liquid drying zone 13 and the treatment liquid drying zone was passed through approximately 900 msec from the start of the jetting of the treatment liquid. In the treatment liquid drying zone 13, a recording medium on which the treatment liquid was applied was dried by blowing a 120° C.—hot air against the treatment liquid-applied surface at 5 msec for 5 seconds using the air blower while heating from the rear side (back face) of the treatment liquid applied surface using the infrared heater so that the surface temperature became within a range of from 40° C. to 45° C.

Subsequently, a cyan ink was applied from the jet head 30C in a single pass at a dot area rate of 20% on the treatment liquid applied surface of the recording medium thereby obtaining a dot image.

While heating the recording medium on which the image was formed from the rear side (back face) of an ink applied surface on the ink drying zone 15 in a similar manner, a hot air was blown to the recording surface at 5 m/sec for 5 seconds by the air blower to dry the image. At this time, the conveying speed was adjusted such that the time between the point in time when a droplet of the cyan ink was impacted on the recording medium and the point in time when the droplet was conveyed to the ink drying zone 15 and drying was started was about 1 second.

By the above-described process, an image sample for evaluation was obtained.

<<Evaluation>>

The image sample for evaluation was subjected to the following evaluation. The evaluation results are listed on Table 2.

<Rubbing Resistance>

On an image portion, a sheet of OK TOP COAT MATTE (trade name, basis weight: 104.7 g/m², manufactured by Oji Paper Co., Ltd.) on which an image was not printed was superimposed, and the sample was rubbed via the sheet at 20 mm stroke for 10 cycles with a load of 200 g applied on 10 cm² thereof. Color migration to the rubbed OK TOP COAT MATTE sheet was then evaluated in five grades by visual inspection.

—Evaluation Criteria—

A: Absolutely non-problematic. No color migration occurred.

B: Non-problematic, although slight color migration was observed on smaller than 10% of the area of the rubbed surface.

C: Practically concerned, as a slight color migration was observed on 10% or larger of the area of the rubbed surface.

D: Practically problematic. Obvious color migration was observed on smaller than 10% of the area of the rubbed surface.

E: Practically considerably problematic. Obvious color migration was observed on 10% or larger of the area of the rubbed surface.

<Blocking Resistance>

This test was performed assuming adhesion and transfer between printed images due to a pressure applied during cutting processing of a printed matter. Two samples each cut into 2 cm×2 cm were layered such that the printed surfaces faced with each other, and a load of 1000 N was applied on the entire thereof for ten seconds, followed by separating the two samples from each other, and then adhesion of an ink on the printed surface and the degree of transfer was evaluated in five grades by visual inspection.

—Evaluation Criteria—

A: Absolutely non-problematic. No adhesion on the printed surface was observed.

B: Non-problematic, although adhesion and/or transfer were observed in a range of from more than 0% to less than 3% of the printed surface.

C: Practically concerned, as adhesion and/or transfer were observed in a range of from 3% to less than 10% of the printed surface.

D: Practically problematic. Adhesion and/or transfer were observed in a range of from 10% to less than 50% of the printed surface.

E: Practically considerably problematic. Adhesion and/or transfer were observed in a range of 50% or more of the printed surface.

<Thermal Stability>

Each of the produced ink composition was placed in a PET container and sealed tightly, and stored in a thermostatic chamber at 50° C. for 14 days, and then a viscosity after the storage was measured. In a similar manner, a viscosity of the ink composition before the storage was measured. The viscosity of the ink composition was measured under a condition of 25° C. by VISCOMETER TV-22 (trade name, manufactured by Tokisangyo Co., Ltd.), and evaluation was performed in accordance with the evaluation criteria below.

—Evaluation Criteria—

A: Absolutely non-problematic. Change in viscosity was ±3% or smaller of the value before storage.

B: Non-problematic, although the change in viscosity was more than ±3% but within ±5% of the value before storage.

C: Practically concerned, as the change in viscosity was more than ±5% but within ±8% of the value before storage.

D: Practically problematic. Change in viscosity was more than ±8% but within ±10% of the value before storage.

E: Practically considerably problematic. Change in viscosity was more than ±10%.

<Jetting Performance>

A solid image was formed by using the ink composition at a printing speed of 2,700 sheets per hour for 30 minutes, and then a parallel line pattern sample (length: 1 cm) of a line image of 75 dpi×2400 dpi was formed. The center position of the parallel line pattern in the line width was measured by using a general purpose image processing apparatus DA-6000 (trade name, manufactured by Oji Scientific Instruments), and the standard deviation σ, that is the shift amount between the measured center position and the theoretical center position, was calculated to perform a five grade evaluation in accordance with the following criteria.

—Evaluation Criteria—

A: $\sigma<1$ μm. Absolutely non-problematic.

B: $1\ \mu m \le \sigma < 3$ μm. Non-problematic.

C: $3\ \mu m \le \sigma < 5$ μm. Practically concerned.

D: $5\ \mu m \le \sigma < 10$ μm. Practically problematic.

E: $10\ \mu m \le \sigma$. Practically considerably problematic.

TABLE 2

|  |  | Ex. 1 | Ex. 2 | Ex. 3 | Ex. 4 | Ex. 5 | Ex. 6 | Ex. 7 |
| --- | --- | --- | --- | --- | --- | --- | --- | --- |
| Urethane resin |  | Urethane resin 1 | Urethane resin 2 | Urethane resin 3 | Urethane resin 4 | Urethane resin 5 | Urethane resin 6 | Urethane resin 7 |
|  | Alicyclic structure [mmol/kg] | 7181 | 6551 | 11455 | 6111 | 8162 | 6243 | 7181 |
|  | Amount of monomer having a content of alicyclic structure of 30% or more [mol %] | 84 | 88 | 93 | 93 | 86 | 80 | 84 |
| Water-soluble organic solvent | TPGmME (SP value = 20.4)* | 2 | 2 | 2 | 2 | 2 | 2 | 5 |
|  | DMI (SP value = 20.3)* |  |  |  |  |  |  |  |
|  | DEGmEE (SP value = 20.9)* |  |  |  |  |  |  |  |
|  | DEGmBE (SP value = 21.5)* |  |  |  |  |  |  |  |
|  | Content of solvent with respect to urethane resin [% by mass] | 25 | 25 | 25 | 25 | 25 | 25 | 62.5 |
| Evaluation | Rubbing resistance | A | A | B | A | B | A | A |
|  | Blocking resistance | A | B | A | B | A | B | B |
|  | Thermal stability | A | A | A | B | A | B | B |
|  | Jetting performance | A | A | B | A | A | B | A |

|  |  | Ex. 8 | Ex. 9 | Ex. 10 | Ex. 11 | Ex. 12 | Comp. Ex. 1 | Comp. Ex. 2 |
| --- | --- | --- | --- | --- | --- | --- | --- | --- |
| Urethane resin |  | Urethane resin 8 | Urethane resin 9 | Urethane resin 10 | Urethane resin 11 | Urethane resin 12 | Urethane resin 13 | Urethane resin 14 |
|  | Alicyclic structure [mmol/kg] | 7181 | 7181 | 6113 | 7181 | 7181 | 5841 | 12143 |
|  | Amount of monomer having a content of alicyclic structure of 30% or more [mol %] | 84 | 84 | 60 | 84 | 84 | 79 | 99 |
| Water-soluble organic solvent | TPGmME (SP value = 20.4)* | 0.7 |  | 2 |  |  | 2 | 2 |
|  | DMI (SP value = 20.3)* |  |  |  | 2 |  |  |  |
|  | DEGmEE (SP value = 20.9)* |  |  |  |  | 2 |  |  |
|  | DEGmBE (SP value = 21.5)* |  | 2 |  |  |  |  |  |
|  | Content of solvent with respect to urethane resin [% by mass] | 8.8 | 25 | 25 | 25 | 25 | 25 | 25 |
| Evaluation | Rubbing resistance | B | B | B | A | A | A | D |
|  | Blocking resistance | A | A | B | B | B | E | A |
|  | Thermal stability | A | A | B | A | A | E | A |
|  | Jetting performance | A | A | B | A | A | D | D |

*The numerical value of a water-soluble organic solvent in each Example represents the content (parts by mass) in the ink composition.

Details and structures of the water-soluble organic solvents in Table 2 are as follows.

TPGmME: tripropylene glycol monomethyl ether (SP value=20.4 $MPa^{1/2}$)

DMI: 1,3-dimethyl-2-imidazolidinone (SP value=20.3 $MPa^{1/2}$)

DEGmEE: diethyleneglycol monoethyl ether (SP value=20.9 $MPa^{1/2}$)

DEGmBE: diethylene glycol monobutyl ether (SP value=21.5 $MPa^{1/2}$)

As listed on Table 2, it is found that change in the viscosity of the ink composition of the present disclosure was small even when the ink composition was stored for a long time period, and excellent rubbing resistance and blocking resistance were obtained.

By comparing Example 1, Example 9, Example 11, and Example 12, it is found that when the SP value of the water-soluble organic solvent was 21 $MPa^{1/2}$ or smaller, an excellent rubbing resistance was obtained.

By comparing Example 1, Example 7, and Example 8, it is found that when the content of the water-soluble organic solvent having an SP value of 21 $MPa^{1/2}$ or smaller with respect to the content of the urethane resin in the ink composition was in a range of from 10% by mass to 50% by mass, both rubbing resistance and blocking resistance were attained at a higher level.

The disclosure of Japanese Patent Application No. 2014-202359 is incorporated herein by reference in its entirety.

All literatures, patents, patent applications, and technical standards described herein are herein incorporated by reference to the same extent as if each individual literature, patent, patent application, or technical standard was specifically and individually indicated as being incorporated by reference.

What is claimed is:

1. An ink composition, comprising:
   a urethane resin that comprises an alicyclic structure at a content of from 6,500 mmol/kg to 12,000 mmol/kg;
   a water-soluble organic solvent;
   water; and
   a colorant.

2. The ink composition according to claim 1, wherein 70 mol % or more of the urethane resin is produced by condensing a monomer having a content of an alicyclic structure of 30% by mass or more.

3. The ink composition according to claim 1, wherein the urethane resin comprises a structure in which a polyol including an alicyclic structure and a polyisocyanate including an alicyclic structure are condensed.

4. The ink composition according to claim 3, wherein the polyol including an alicyclic structure is a hydrogenated bisphenol A.

5. The ink composition according to claim 1, wherein the polyisocyanate including an alicyclic structure is 4,4'-methylenebis (cyclohexyl isocyanate).

6. The ink composition according to claim 1, wherein the SP value of the water-soluble organic solvent is 21 MPa$^{1/2}$ or lower.

7. The ink composition according to claim 6, wherein a content of the water-soluble organic solvent is from 10% by mass to 50% by mass with respect to a content of the urethane resin.

8. The ink composition according to claim 1, wherein the water-soluble organic solvent is tripropylene glycol monomethyl ether.

9. The ink composition according to claim 1, wherein the urethane resin comprises an alicyclic structure at a content of from 6,500 mmol/kg to 10,000 mmol/kg, and a content of the water-soluble organic solvent is from 10% by mass to 50% by mass with respect to a content of the urethane resin.

10. The ink composition according to claim 1, which is used for ink jet recording.

11. An image forming method, comprising forming an image by applying the ink composition according to claim 1 to an image recording medium by an ink jet method.

12. A method of producing an ink composition, the method comprising:
    manufacturing a urethane resin that comprises an alicyclic structure at a content of from 6,500 mmol/kg to 12,000 mmol/kg by condensing all raw material monomers, 70 mol % or more of the all raw material monomers comprising an alicyclic structure, and a mass of the alicyclic structure with respect to a mass of the monomer being 30% or more; and
    preparing the ink composition by mixing the urethane resin, a water-soluble organic solvent, water, and a colorant.

13. The method of producing an ink composition according to claim 12, wherein the manufacturing of the urethane resin comprises condensing a polyol including an alicyclic structure and a polyisocyanate including an alicyclic structure.

* * * * *